(12) United States Patent
Kang et al.

(10) Patent No.: US 6,497,961 B2
(45) Date of Patent: *Dec. 24, 2002

(54) CERAMER COMPOSITION AND COMPOSITE COMPRISING FREE RADICALLY CURABLE FLUOROCHEMICAL COMPONENT

(75) Inventors: Soonkun Kang, Lake Elmo, MN (US); George G. I. Moore, Afton, MN (US); Thomas W. Rambosek, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 22 days.

This patent is subject to a terminal disclaimer.

(21) Appl. No.: 09/821,366

(22) Filed: Mar. 29, 2001

(65) Prior Publication Data

US 2002/0001710 A1 Jan. 3, 2002

Related U.S. Application Data

(62) Division of application No. 09/255,195, filed on Feb. 22, 1999, now Pat. No. 6,238,798.

(51) Int. Cl.[7] .................. B32B 27/16; B32B 27/20; B32B 27/28; B32B 27/30
(52) U.S. Cl. .................. 428/421; 428/422; 428/331; 522/99; 522/148; 522/172; 427/487; 427/503; 427/515; 526/242; 526/243; 526/245; 526/247; 526/248; 526/279
(58) Field of Search .................. 428/421, 422, 428/331; 522/99, 148, 172; 427/487, 503, 515; 526/242, 243, 245, 247, 248, 279

(56) References Cited

U.S. PATENT DOCUMENTS

| | | | |
|---|---|---|---|
| 2,592,069 A | 4/1952 | Reid | 260/89.1 |
| 2,642,416 A | 6/1953 | Ahlbrecht et al. | 260/83.5 |
| 2,801,185 A | 7/1957 | Iler | 106/288 |
| 2,803,615 A | 8/1957 | Ahlbrecht et al. | 260/29.6 |
| 2,826,564 A | 3/1958 | Bovey et al. | 260/83.5 |
| 2,995,542 A | 8/1961 | Brown | 260/79.3 |
| 3,055,932 A | 9/1962 | Verbanic et al. | 260/486 |
| 3,078,245 A | 2/1963 | Heine | 260/29.6 |
| 3,081,274 A | 3/1963 | Heine | 260/29.6 |
| 3,102,103 A | 8/1963 | Ahlbrecht et al. | 260/29.6 |
| 3,282,905 A | 11/1966 | Fasick et al. | 260/89.5 |
| 3,291,846 A | 12/1966 | Fritz et al. | 260/614 |
| 3,304,278 A | 2/1967 | Hauptschein et al. | 260/29.6 |
| 3,321,445 A | 5/1967 | Lazerte et al. | 260/75 |
| 3,325,163 A | 6/1967 | Off et al. | 270/59 |
| 3,787,351 A | 1/1974 | Olson | 260/40 |
| 4,455,205 A | 6/1984 | Olson et al. | 204/159.13 |
| 4,478,876 A | 10/1984 | Chung | 427/54.1 |
| 4,486,504 A | 12/1984 | Chung | 428/412 |
| 4,491,508 A | 1/1985 | Olson et al. | 204/159.13 |
| 4,522,958 A | 6/1985 | Das et al. | 523/212 |
| 4,540,765 A | 9/1985 | Koemm et al. | 528/45 |
| 4,705,699 A | 11/1987 | Burguette et al. | 427/54.1 |
| 5,104,929 A | 4/1992 | Bilkadi | 524/847 |
| 5,176,943 A | 1/1993 | Woo | 428/64 |
| 5,239,026 A | 8/1993 | Babirad et al. | 526/245 |
| 5,242,719 A | 9/1993 | Medford et al. | 427/515 |
| 5,258,225 A | 11/1993 | Katsamberis | 428/331 |
| 5,274,159 A | 12/1993 | Pellerite et al. | 556/485 |
| 5,306,758 A | 4/1994 | Pellerite | 524/366 |
| 5,314,980 A | 5/1994 | Morrison | 528/19 |
| 5,541,049 A | 7/1996 | Ballerini et al. | 430/527 |
| 5,708,048 A | 1/1998 | Medford et al. | 522/64 |
| 6,132,861 A | 10/2000 | Kang et al. | |
| 6,238,798 B1 * | 5/2001 | Kang et al. | 427/487 |
| 6,245,833 B1 * | 6/2001 | Kang et al. | 106/287.12 |
| 6,265,061 B1 * | 7/2001 | Kang et al. | 428/323 |
| 6,376,576 B2 * | 4/2002 | Kang et al. | 523/202 |

FOREIGN PATENT DOCUMENTS

| | | |
|---|---|---|
| GB | 1 303 107 | 1/1970 |
| JP | 2-260 145 | 10/1990 |
| WO | WO 96/36669 A1 | 11/1996 |
| WO | WO 97/00995 | 1/1997 |
| WO | WO 97/39072 | 10/1997 |
| WO | WO 99/57205 | 11/1999 |

OTHER PUBLICATIONS

E.P. Pleuddeman, "Silane Coupleing Agents", *Plenum Press*, New York, 1982, pp. 20–23 and 97.

S. Sterman et al., "Theory of Mechanisms of Silane Coupling Agents in Glass Reinforced and Filled Thermoplastic and Thermosetting Resin Systems", Union Carbide Corporation, New York.

"A Guide to Dow Corning Silane Coupling Agents", Dow Corning Corporation, 1985, pp. 2–13.

* cited by examiner

Primary Examiner—Vivian Chen
(74) Attorney, Agent, or Firm—Kent S. Kokko

(57) ABSTRACT

A ceramer composition is provided that comprises a plurality of colloidal inorganic oxide particles and a free-radically curable binder precursor. The free-radically curable binder precursor comprises a fluorochemical component that further comprises at least two free-radically curable moieties and at least one fluorinated moiety. By virtue of the inclusion of the fluorochemical component, the ceramer compositions of the present invention can be used to provide ceramer composites and ceramer composite structures with excellent stain, oil and/or water repellency characteristics as well as a high level of abrasion resistance and hardness.

28 Claims, No Drawings

CERAMER COMPOSITION AND COMPOSITE COMPRISING FREE RADICALLY CURABLE FLUOROCHEMICAL COMPONENT

RELATED APPLICATION INFORMATION

This application is a divisional of prior application Ser. No. 09/255,195, filed Feb. 22, 1999, now U.S. Pat. No. 6,238,798.

FIELD OF THE INVENTION

This invention relates to protective composites and methods of making the same. More particularly, the invention relates ceramer compositions and to stain resistant, oil and/or water repellant ceramer composites comprising a free-radically curable fluorochemical component.

BACKGROUND OF THE INVENTION

Thermoplastic and thermosetting polymers are used to form a wide variety of structures for which properties such as abrasion resistance, optical clarity (i.e., good light transmittance) and/or the like, are desired characteristics. Examples of such structures include camera lenses, eyeglass lenses, binocular lenses, retroreflective sheeting, automobile windows, building windows, train windows, boat windows, aircraft windows, vehicle headlamps and taillights, display cases, eyeglasses, watercraft hulls, road pavement markings, overhead projectors, stereo cabinet doors, stereo covers, furniture, bus station plastic, television screens, computer screens, watch covers, instrument gauge covers, bakeware, optical and magneto-optical recording disks, and the like. Examples of polymer materials used to form these structures include thermosetting or thermoplastic polycarbonate, poly (meth)acrylate, polyurethane, polyester, polyamide, polyimide, phenoxy, phenolic resin, cellulosic resin, polystyrene, styrene copolymer, epoxy, and the like.

Many of these thermoplastic and thermosetting polymers have excellent rigidity, dimensional stability, transparency, and impact resistance, but unfortunately have poor abrasion resistance. Consequently, structures formed from these materials are susceptible to scratches, abrasion, and similar damage.

To protect these structures from physical damage, a tough, abrasion resistant "hardcoat" layer may be coated onto the structure. Many previously known hardcoat layers incorporate a binder matrix formed from free-radically curable prepolymers such as (meth)acrylate functional monomers. Such hardcoat compositions have been described, for example, in Japanese patent publication JP 02-260145, U.S. Pat. No. 5,541,049, and U.S. Pat. No. 5,176,943. One particularly excellent hardcoat composition is described in WO 96/36669 A1. This publication describes a hardcoat formed from a "ceramer" used, in one application, to protect the surfaces of retroreflective sheeting from abrasion. As defined in this publication, a ceramer is a composition having inorganic oxide particles, e.g., silica, of nanometer dimensions dispersed in a binder matrix.

Many ceramers are derived from aqueous sols of inorganic oxide particles according to a process in which a free-radically curable binder precursor (e.g., one or more different free-radically curable monomers, oligomers, and/or polymers) and other optional ingredients (such as surface treatment agents that interact with the inorganic oxide particles, surfactants, antistatic agents, leveling agents, initiators, stabilizers, sensitizers, antioxidants, crosslinking agents, crosslinking catalysts, and the like) are blended into the aqueous sol. The resultant ceramer composition may then be dried to remove substantially all of the water. The drying step may also be referred to as "stripping". An organic solvent may then be added, if desired, in amounts effective to provide the ceramer composition with viscosity characteristics suitable for coating the ceramer composition onto the desired substrate. After coating, the ceramer composition can be dried to remove substantially all of the solvent and then exposed to a suitable source of energy to cure the free-radically curable binder precursor, thereby providing the desired, abrasion resistant hardcoat layer on the substrate.

Although such ceramer compositions, upon curing, generally provide at least some level of abrasion resistance to a substrate, they generally do not provide appreciable stain resistance or oil and/or water repellency. As a result, substrates comprising a cured ceramer composite are susceptible to staining due to prolonged contact with oil, water or other stain causing agents. Such staining impairs the optical clarity and appearance of the substrate. It is therefore desirable to incorporate agents into ceramer compositions that will provide the ceramer composition, upon curing, with stain, oil and/or water resistance, while still maintaining the desired hardness and abrasion resistance characteristics of the resultant, cured ceramer composite.

Fluorochemicals tend to form compositions with low surface energy, and compositions with a low surface energy generally tend to show better stain, oil and water repellency than compositions with a higher surface energy. Thus, the incorporation of a fluorochemical into a ceramer composition would be desirable in order to enhance the ability of a cured ceramer composite to repel oil and/or water, and to resist staining.

Unfortunately, however, the incorporation of fluorochemicals into a ceramer composition is extremely difficult. Because fluorochemicals are both hydrophobic (incompatible with water) and oleophobic (incompatible with nonaqueous organic substances), the incorporation of a fluorochemical into a ceramer composition, which is hydrophilic, often results in phase separation between the fluorochemical and other ingredients of the ceramer composition. Colloid flocculation may also result. This undesirable phase separation and/or colloid flocculation can result not only when the ingredients are mixed together, but also during the stripping process, i.e., when water is removed from the blended ceramer composition. Finally, not only can fluorochemicals be incompatible with the colloidal inorganic oxide component of ceramer compositions, but such materials also would be expected to adversely affect the hardness and abrasion resistance characteristics of a resultant cured ceramer composite into which such fluorochemicals are incorporated.

It would thus be desirable to provide a ceramer composite that exhibits both the desired hardness and abrasion resistance characteristics, while also exhibiting stain, oil and/or water repellency. It would further be desirable to utilize fluorochemicals to provide the desired stain, oil and/or water repellency, while avoiding compatibility and hardness problems generally associated with the incorporation of fluorochemicals into ceramer compositions.

SUMMARY OF THE INVENTION

The present invention relates to a unique and effective approach for incorporating free-radically curable fluorochemicals into ceramer compositions. Specifically, it has now been discovered that a fluorochemical component comprising at least two free-radically curable moieties and at least one fluorinated moiety, can be successfully incorporated into a ceramer composition, i.e., without phase separation and/or colloid flocculation of the ceramer composition. Additionally, the ceramer compositions into which the fluorochemical component is incorporated, upon curing, provide ceramer composites that exhibit excellent hardness, abrasion resistance, weatherability, and stain, oil and/or water repellency characteristics.

Accordingly, in one aspect, the present invention relates to a free-radically curable ceramer composition, as well as a corresponding free-radically cured ceramer composite, comprising a plurality of surface-treated colloidal inorganic oxide particles and a free-radically curable binder precursor comprising a fluorochemical component having at least two free-radically curable moieties and at least one fluorinated moiety. In certain preferred embodiments, the surface treated colloidal inorganic oxide particles may be surface treated with a plurality of surface treatment agents.

The ceramer compositions of the present invention can be utilized to provide substrates with durability, hardness and stain, oil and/or water repellency characteristics. Thus, in another aspect, the present invention relates to a ceramer composite structure comprising a free-radically cured ceramer composite and a method of making such a ceramer composite structure. The ceramer composite structure is made by coating at least a portion of the substrate with the free-radically curable ceramer composition of the present invention. The substrate so coated is subsequently irradiated with an amount of curing energy effective to at least partially cure the free-radically curable ceramer composition, whereby the cured ceramer composite is formed on the surface of the substrate, thereby providing a ceramer composite structure in accordance with the present invention.

As used herein, the phrase "ceramer composition" is meant to indicate a ceramer formulation in accordance with the present invention that has not been at least partially cured with radiation energy, and thus is a flowing, coatable liquid. The phrase "ceramer composite" is meant to indicate a ceramer formulation in accordance with the present invention that has been at least partially cured with radiation energy, such that it is a substantially non-flowing solid. Additionally as used herein, the phrase "free-radically polymerizable" refers to the ability of monomers, oligomers, polymers or the like to participate in crosslinking reactions upon exposure to a suitable source of curing energy.

DETAILED DESCRIPTION OF THE PRESENTLY PREFERRED EMBODIMENTS

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

One embodiment of a preferred ceramer composition of the present invention is prepared from ingredients comprising a plurality of surface treated colloidal inorganic oxide particles and a free-radically curable binder precursor. The precursor includes a free-radically curable fluorochemical component comprising at least two free-radically curable moieties and at least one fluorinated moiety, and a surface treatment agent for the colloidal inorganic oxide particles to promote compatibility and/or reactivity between the colloidal inorganic oxide particles and one or more of the other ingredients of the ceramer composition. The surface treatment agent comprises a curable silane component having at least one hydrolyzable silane moiety and at least one curable moiety other than a silane moiety. Furthermore, in certain preferred embodiments, the ceramer composition may additionally comprise a surface treatment agent.

Preferably the additional surface treatment agent further comprises a fluoro/silane component which comprises at least one hydrolyzable silane moiety and at least one fluorinated moiety.

A wide range of amounts of these materials may be incorporated into the composition with beneficial results. For example, ceramer compositions may comprise from about 100 parts by weight of the free-radically curable binder precursor and about 10 to 50 parts by weight of the colloidal inorganic oxide particles. More preferably, the composition includes about 100 parts by weight of the free-radically curable binder precursor and about 25 to 40 parts by weight of the colloidal inorganic oxide particles, wherein 0.1 to 25 weight percent of the free-radically curable binder precursor is the free-radically curable fluorochemical component. Preferably, 1.5 to 20 weight percent of the free-radically curable binder precursor is the free-radically curable fluorochemical component.

Suitable free-radically curable fluorochemical components generally include monomers, oligomers or polymers having at least two free-radically curable moieties and at least one fluorinated moiety. A preferred class of useful free-radically curable fluorochemical components can be represented by the following formula:

$$(R_A)_x\text{—W—}(R_f)_y \tag{1}$$

In Formula (1), each $R_A$ independently represents a free-radically curable moiety, each $R_f$ independently represents a fluorinated moiety, x is at least 2, preferably from about 2 to about 5, more preferably 2; y is at least 1, preferably from about 1 to about 5, more preferably 1; and W is a linking group having x+y valent sites. Preferably, the compound of Formula 1 has a weight average molecular weight in the range of from about 350 to about 1000. Compounds of formula 1 having two free-radically curable moieties impart desired hardness, non-tackiness and low surface energy properties to the ultimate coatings.

In the practice of the present invention, "free-radically curable moiety" refers to a moiety directly or indirectly pendant from a monomer, oligomer, or polymer backbone (as the case may be) that participates in crosslinking reactions upon exposure to a suitable source of curing energy, e.g., radiation. More specifically, suitable sources of curing energy include an electron beam, heat (thermal energy), ultraviolet light, visible light, microwaves, infrared energy, and the like. Representative examples of free-radically curable moieties suitable in the practice of the present invention include (meth)acrylate groups, olefinic carbon-carbon double bonds, allyloxy groups, alpha-methyl styrene groups, (meth)acrylamide groups, vinyl ether groups, combinations of these, and the like. As used herein, the term "monomer" refers to a single, one unit molecule capable of combination with itself or other monomers to form oligomers or polymers. The term "oligomer" refers to a compound that is a combination of 2 to 20 monomers. The term "polymer" refers to a compound that is a combination of 21 or more monomers.

The prefix "(meth)acryl-" indicates a compound that comprises a carbonyl, —C(O)—, moiety and a carbon-carbon double bond that is in a conjugative relationship, i.e., formed between carbon atoms in an α-β position, relative to the carbonyl moiety. Preferred (meth)acryl moieties are represented by the formula:

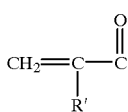 (2)

wherein each R' independently is hydrogen or a linear, branched or cyclic group, preferably a linear, branched, or cyclic alkyl group having 1 to 10 carbon atoms, more preferably H, —CH$_3$, or —CH$_2$CH$_3$.

Preferably, each R$_f$ moiety of Formula (1) independently is a monovalent or divalent, perfluorinated moiety that may be linear, branched, or cyclic. Most preferably, R$_f$ is monovalent. Any of a wide variety of perfluorinated moieties are suitable for use as R$_f$. Representative examples of suitable perfluorinated moieties include perfluoroalkyl, perfluoroalkylene, perfluoroalkoxy, and/or oxyperfluoroalkylene moieties having 1 to 20, preferably 3 to 20, more preferably 6 to 10 carbon atoms. The most preferred monovalent perfluorinated moieties are those of the general formula C$_n$F$_{2n+1}$, wherein n is 1 to 20, preferably 3 to 20, most preferably 6 to 10 carbons atoms and where one or more non-adjacent CF$_2$ groups may be replaced by oxygen atoms. Examples of such perfluorinated moieties include C$_8$F$_{17}$— and C$_{10}$F$_{21}$—. If any R$_f$ is divalent, both valence sites of such an R$_f$ moiety preferably are linked to W directly as illustrated by the following formula:

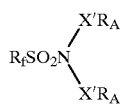 (3)

From Formula (3), it can be seen that each divalent R$_f$ moiety bonds to two valent sites on W. The most preferred divalent perfluorinated moieties are those of the general formula C$_n$F$_{2n}$, wherein n is 3 to 10, prefereably 4 to 6, most prefereably 5 carbons atoms and where one or more non-adjacent CF$_2$ groups may be replaced by oxygen atoms.

Generally, W of Formula (1) preferably may be any moiety capable of linking the R$_A$ moieties and the at least one R$_f$ moiety together. Preferably, W comprises a backbone of 3 to 30 carbon atoms, heteroatoms, e.g., N, S, O or the like, or combinations thereof. As representative examples, the backbone may comprise one or more moieties such as an alkylene moiety, a ether moiety, a ester moiety, a urethane moiety, a carbonate moiety, a imide moiety, a amide moiety, an aryl moiety, an alkaryl moiety, an alkoxyaryl moiety, sulfonyl, nitrogen, oxygen, combinations of these, and the like.

A preferred free-radically curable fluorochemical component according to Formula (1) is represented by the formula:

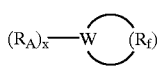 (4)

wherein each X' is independently any divalent linking group capable of linking the R$_A$ moieties to the nitrogen moiety.

Preferably, each X' is independently a divalent linking group comprising 1 to 20, and more preferably 2 to 10 carbon atoms. Divalent linking group X' may be linear, branched, cyclic, polycyclic, combinations of these and the like. Divalent linking groups suitable for use as X' include, for example, groups that comprise an alkylene moiety, a ether moiety, a perfluorinated ether moiety, a ester moiety, a urethane moiety, a carbonate moiety, a imide moiety, a amide moiety, an aryl moiety, an alkaryl moiety, an alkoxyaryl moiety, an arylene moiety, an aralkylene moiety, an alkoxy moiety, an acyloxy, a sulfoxide, combinations thereof, and the like, and is preferably alkylene.

Another preferred free-radically curable fluorochemical component according to formula (1) is represented by the formula:

wherein n is 2 to 10.

If desired, up to 50 weight percent of the radically curable fluorochemical component according to Formula (1) can be replaced by a fluorochemical component of the following formula:

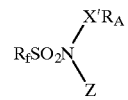

wherein each X' is independently any divalent linking group capable of linking the R$_A$ moieties to the nitrogen moiety. Preferably, each X' is independently a divalent linking group comprising 1 to 20, and more preferably 2 to 10 carbon atoms. Divalent linking group X' may be linear, branched, cyclic, polycyclic, combinations of these and the like. Z is a hydrogen atom or a lower alkyl group.

Representative specific examples of monofunctional, free-radically polymerizable fluorochemical components according to Formulas 1, 2 and 4, and methods of preparation, are disclosed in U.S. Pat. Nos. 5,239,026 (Savu), U.S. Pat. Nos. 2,592,069, 2,995,542, 3,078,245, 3,081,274, 3,291,843, and 3,325,163 2,803,615, 2,642,416, 2,826,564, 3,102,103, 3,282,905, and 3,304,278 and include 1,1-dihydroperfluorocyclohexane carbinol acrylate, 1,1-dihydroperfluorocyclohexane carbinol methacrylate, 1,1-dihydroperfluorocyclopentane carbinol acrylate, 1,1-dihydroperfluorocyclopentane carbinol methacrylate, 1,1-dihydroperfluorooctyl acrylate, 1,1-dihydroperfluorooctyl methacrylate, 1,1-dihydroperfluorobutyl acrylate, 1,1,2,2-tetrahydroperfluorooctyl acrylate, 1,1,2,2-tetrahydroperfluorooctyl methacrylate, 1,1,2,2-tetrahydroperfluorodecyl acrylate, 1,1,2,2-tetrahydroperfluorodecyl methacrylate, 1H,1H,5H-octafluoropentyl acrylate, 1H,1H,11H-eicosafluoroundecyl acrylate, hexafluoroisopropyl acrylate, and perfluoropentyl acrylate and (meth)acrylates of the following structure:

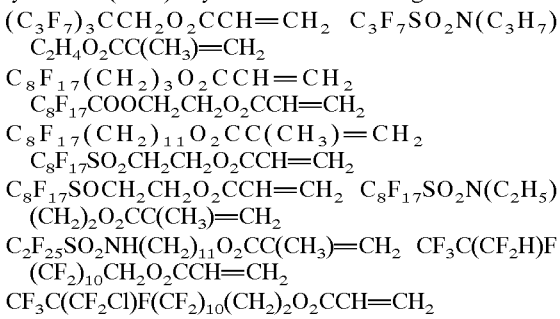

$C_8F_{17}SO_2N(CH_3)C_2H_4O_2CC(CH_3)=CH_2$
and
$C_4F_9CONHCH_2CH_2O_2CC(CH_3)=CH_2$ Especially preferred fluorinated acrylate monomers are 1,1-dihydroperfluorocyclohexane carbinol acrylate, 2-(N-ethyl perfluorooctane sulphonamido)ethyl acrylate, 2-(N-ethyl perfluorooctanesulphonamido)ethyl methacrylate, 2-(N-butyl perfluorooctanesulphonamido)ethyl acrylate.

Difunctional, free-radically polymerizable fluorochemical components according to Formulas 1, 2 and 4 can be prepared, for examples by acylation of the corresponding dihydroxy-functional fluorochemicals. Such dihydroxy compounds are disclosed, for example, in U.S. Pat. Nos. 4,540,765 (Geisler), U.S. Pat. No. 3,321,445 (LaZerte) and in G.B. 1,303,107. A particularly preferred embodiment of a free-radically curable fluorochemical component according to Formula (4), for example, is the compound $C_8F_{17}SO_2N[C_2H_4OCOCH=CH_2]_2$.

Preferably, in addition to the free-radically curable fluorochemical component, the free-radically curable binder precursor may optionally include one or more other free-radically curable monomers, oligomers, and/or polymers. For example, optional free-radically curable monomers, oligomers, and/or polymers suitable in the practice of the present invention are preferably selected from combinations of mono-, di-, tri-, tetra-, penta-, and hexafunctional free-radically curable monomers.

Various amounts of the optional mono-, di-, tri-, tetra-, penta-, and hexafunctional free-radically curable monomers may be incorporated into the free-radically curable binder precursor, depending upon the desired properties of the final ceramer composition or composite. For example, in order to provide ceramer composites with higher levels of abrasion and impact resistance, the free-radically curable binder precursor desirably includes one or more optional multi-functional free-radically curable monomers, preferably at least both di- and tri-functional free-radically curable monomers, such that the free-radically curable monomers incorporated into the free-radically curable binder precursor have an average free-radically curable functionality per molecule of greater than 1.

Preferably, the free-radically curable binder precursor may include 0 to 35 parts by weight of optional monofunctional free-radically curable monomers, 1 to 75 parts by weight of optional difunctional free-radically curable monomers, 0 to 75 parts by weight of optional trifunctional free-radically curable monomers, 0 to 75 parts by weight of optional tetrafunctional free-radically curable monomers, 0 to 75 parts by weight of optional pentafunctional free-radically curable monomers, and 0 to 75 parts by weight of optional hexafunctional free-radically curable monomers, subject to the proviso that the optional free-radically curable monomers have an average functionality of greater than 1, preferably 1.1 to 4, more preferably 1.5 to 3.

One representative class of optional monofunctional free-radically curable monomers suitable for use in the free-radically curable binder precursor includes compounds in which a carbon-carbon double bond is directly or indirectly linked to an aromatic ring. Examples of such compounds include styrene, alkylated styrene, alkoxy styrene, alkylated vinyl naphthalene, alkoxy vinyl naphthalene, combinations of these, and the like. Another representative class of monofunctional, free-radically curable monomers includes compounds in which a carbon-carbon double bond is attached to a cycloaliphatic, heterocyclic, and/or aliphatic moiety such as 5-vinyl-2-norbornene, 4-vinyl pyridine, 2-vinyl pyridine, 1-vinyl-2-pyrrolidinone, 1-vinyl caprolactam, 1-vinylimidazole, N-vinyl formamide, and the like.

Another representative class of such optional monofunctional free-radically curable monomers suitable for use as the free-radically curable binder precursor include (meth)acrylate functional monomers that incorporate (meth)acryl moieties as defined above. Representative examples of such monomers include (meth)acrylamides, chloro(meth) acrylamide, linear, branched, or cycloaliphatic esters of (meth)acrylic acid containing from 1 to 20, preferably 1–8, carbon atoms, such as methyl (meth)acrylate, n-butyl(meth) acrylate, t-butyl(meth)acrylate, ethyl(meth)acrylate, isopropyl (meth)acrylate, and 2-ethylhexyl(meth)acrylate; vinyl esters of alkanoic acids wherein the alkyl moiety of the alkanoic acids contain 2 to 20, preferably 2 to 4, carbon atoms and may be linear, branched, or cyclic; isobornyl (meth)acrylate; vinyl acetate; allyl(meth)acrylate, and the like.

The optional monofunctional, free radically curable monomers may also include other kinds of functionality such as hydroxyl functionality, nitrile functionality, epoxy functionality, carboxylic functionality, thiol functionality, amine functionality, sulfonyl functionality, combinations of these, and the like. Representative examples of such (meth) acrylate functional monomers include glycidyl(meth) acrylate, (meth)acrylonitrile, β-cyanoethyl-(meth)acrylate, 2-cyanoethoxyethyl (meth)acrylate, p-cyanostyrene, p-(cyanomethyl)styrene, an ester of an ,β-unsaturated carboxylic acid with a diol, e.g., 2-hydroxyethyl(meth)acrylate, or 2-hydroxypropyl(meth)acrylate; 1,3-dihydroxypropyl-2-(meth)acrylate; 2,3-dihydroxypropyl-1-(meth)acrylate; an adduct of an ,β-unsaturated carboxylic acid with caprolactone; an alkanol vinyl ether such as 2-hydroxyethyl vinyl ether; 4-vinylbenzyl alcohol; allyl alcohol; p-methylol styrene, (meth)acryloyloxyethyl trimethyl ammonium chloride, (meth)acrylamidopropyl trimethylammonium chloride, vinylbenzyl trimethylammonium chloride, 2-hydroxy-3-allyloxypropyl trimethylammonium chloride, (meth)acryloyloxypropyl dimethylbenzylammonium chloride, dimethylaminoethyl (meth)acrylate, vinylbenzyl trimethylammonium chloride, N-(3-sulfopropyl)-N-(meth) acryloyloxyethyl-N,N-dimethylammonium betaine, 2-[(meth)acryloyloxy]ethyl trimethylammonium methosulfate, N-(3-sulfopropyl)-N-(meth) acrylamidopropyl-N,N-dimethylammonium betaine, N,N-dimethylamino(meth)acrylate, (meth)acryloyloxyethyl acid phosphate, (meth)acrylamidopropyl sodium sulfonate, sodium styrene sulfonate, styrene sulfonic acid, (meth) acrylic acid, maleic acid, fumaric acid, maleic anhydride, vinyl sulfonic acid, 2-(meth)acrylamide-2-methyl-1-propanesulfonic acid, maleic anhydride, mixtures thereof, and the like.

Another representative class of the optional monofunctional free-radically curable monomers includes one or more N,N-disubstituted (meth)acrylamides. Use of an N,N-disubstituted (meth)acrylamide provides numerous advantages. For example, the use of this kind of monomer provides ceramer composites that show improved adhesion to certain substrate materials. Further, use of this kind of monomer also provides ceramer composites with improved weatherability and durability. Preferably, the N,N-disubstituted (meth)acrylamide has a molecular weight in the range from 99 to about 500, preferably from about 99 to about 200, in order to minimize the tendency, if any, of the colloidal inorganic oxide particles to flocculate and precipitate out of the ceramer composition.

Such N,N-disubstituted (meth)acrylamide monomers generally have the formula:

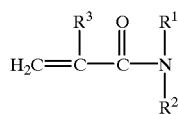

(5)

In Formula (5), each $R^1$ and $R^2$ are independently hydrogen, a $(C_1-C_8)$alkyl group (linear, branched, or cyclic) optionally having hydroxy, halide, carbonyl, and amido functionalities, a $(C_1-C_8)$alkylene group optionally having carbonyl and amido functionalities, a $(C_1-C_4)$alkoxymethyl group, a $(C_4-C_{18})$aryl group, a $(C_1-C_3)$alk$(C_4-C_{18})$aryl group, or a $(C_4-C_{18})$heteroaryl group; with the proviso that only one of $R^1$ and $R^2$ is hydrogen; and $R^3$ is hydrogen, a halogen, or a methyl group. Preferably, $R^1$ is a $(C_1-C_4)$alkyl group; $R^2$ is a $(C_1-C_4)$alkyl group; and $R^3$ is hydrogen, or a methyl group. $R^1$ and and $R^2$ can be the same or different. More preferably, each of $R^1$ and $R^2$ is $CH_3$, and $R^3$ is hydrogen.

For example, (meth)acrylamide monomers suitable for use in the free-radically curable binder precursor in accordance with the present invention are N-(3-bromopropionamidomethyl) acrylamide, N-tert-butylacrylamide, N,N-dimethylacrylamide, N,N-diethylacrylamide, N-(5,5-dimethylhexyl)acrylamide, N-(1,1-dimethyl-3-oxobutyl)acrylamide, N-(hydroxymethyl) acrylamide, N-(isobutoxymethyl)acrylamide, N-isopropylacrylamide, N-methylacrylamide, N-ethylacrylamide, N-methyl-N-ethylacrylamide, N-(fluoren-2-yl)acrylamide, N-(2-fluorenyl)-2-methylacrylamide, 2,3-bis(2-furyl)acrylamide, N,N'-methylene-bis acrylamide. A particularly preferred (meth) acrylamide is N,N-dimethyl (meth)acrylamide.

Optional multifunctional free radically curable monomers preferably comprise (meth)acrylate compounds, because these are commercially available from a number of different suppliers. Alternatively, such compounds can be prepared using a variety of well known reaction schemes. For example, according to one approach, a (meth)acrylic acid or acyl halide or the like is reacted with a polyol having at least two, preferably 2 to 6, hydroxyl groups. According to another approach, a hydroxy or amine functional (meth) acrylate compound or the like is reacted with a polyisocyanate, or isocyanurate, or the like having 2 to 6 NCO groups or the equivalent.

A preferred class of multifunctional (meth)acryl functional compounds for use in the free-radically curable binder precursor includes one or more multifunctional, ethylenically unsaturated esters of (meth)acrylic acid and may be represented by the following formula:

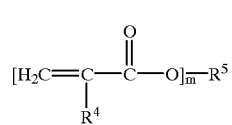

(6)

In Formula (6), each $R^4$ independently represents a hydrogen, halogen or a $(C_1-C_4)$alkyl group; each $R^4$ independently represents a polyvalent organic group having m valencies and can be cyclic, branched, or linear, aliphatic, aromatic, or heterocyclic, having carbon, hydrogen, nitrogen, nonperoxidic oxygen, sulfur, or phosphorus atoms; and m is an integer designating the number of acrylic or methacrylic groups in the ester and has a value of 2 to 7. Preferably, $R^4$ is hydrogen, methyl, or ethyl; $R^5$ has a molecular weight of about 14–100; and m has a value of 2–6. More preferably, m has a value of 2–5, most preferably 3–4. Where a mixture of multifunctional acrylates and/or methacrylates are used, m preferably has an average value of about 1.05 to 3.

Specific examples of suitable multifunctional ethylenically unsaturated esters of polyhydric alcohols suitable for use in the free-radically curable binder precursor are the polyacrylic acid or polymethacrylic acid esters of polyhydric alcohols including, for example, the diacrylic acid and dimethylacrylic acid ester of aliphatic diols such as ethyleneglycol, triethyleneglycol, 2,2-dimethyl-1,3-propanediol, 1,3-cyclopentanediol, 1-ethoxy-2,3-propanediol, 2-methyl-2,4-pentanediol, 1,4-cyclohexanediol, 1,6-hexamethylenediol, 1,2-cyclohexanediol, 1,6-cyclohexanedimethanol; the triacrylic acid and trimethacrylic acid esters of aliphatic triols such as glycerin, 1,2,3-propanetrimethanol, 1,2,4-butanetriol, 1,2,5-pentanetriol, 1,3,6-hexanetriol, and 1,5,10-decanetriol; the triacrylic acid and trimethacrylic acid esters of tris (hydroxyethyl) isocyanurate; the tetraacrylic and tetramethacrylic acid esters of aliphatic tetraols, such as 1,2,3,4-butanetetrol, 1,1,2,2-tetramethylolethane, 1,1,3,3-tetramethylolpropane, and pentaerythritol; the pentaacrylic acid and pentamethacrylic acid esters of aliphatic pentols such as adonitol; the hexaacrylic acid and hexamethacrylic acid esters of hexanols such as sorbitol and dipentaerythritol; the diacrylic acid and dimethacrylic acid esters of aromatic diols such as resorcinol, pyrocatechol, bisphenol A, and bis(2-hydroxyethyl) phthalate; the trimethacrylic acid ester of aromatic triols such as pyrogallol, phloroglucinol, and 2-phenyl-2,2-methylolethanol; and the hexaacrylic acid and hexamethacrylic acid esters of dihydroxy ethyl hydantoin; and mixtures thereof.

Generally, ceramer compositions including oligomeric and/or polymeric free-radically curable materials as a portion of the free-radically curable binder precursor tend to have higher viscosities than ceramer compositions including only free-radically curable monomers as constituents of the free-radically curable binder precursor. Accordingly, in applications in which it is desirable for the ceramer composition to have a low viscosity, e.g., a viscosity of less than 200 centipoise measured at 25° C. using a Brookfield viscometer with any suitable spindle operated at a spindle speed in the range from 20 to 50 rpm, it is preferred, that at least 50%, by weight, preferably at least substantially all, of the prepolymers are free-radically curable monomers. For example, in applications wherein the ceramer composition is to be spin coated, it would be desirable for the ceramer composition to have a sufficiently low viscosity to allow the spin coating technique to be used.

Inorganic oxide particles of the present invention are desirably substantially spherical in shape, relatively uniform in size (have a substantially monodisperse size distribution) or a polymodal distribution obtained by blending two or more substantially monodisperse distributions. It is further preferred that the inorganic oxide particles be and remain substantially non-aggregated (substantially discrete), as aggregation can result in precipitation of the inorganic oxide particles or gellation of the ceramer composition, which, in turn, results in a dramatic, undesirable increase in viscosity. As a result of these effects, aggregation of the inorganic oxide particles can reduce both adhesion to a substrate and optical clarity of the ceramer composition.

It is further preferred that the inorganic oxide particles be colloidal in size, i.e., characterized by an average particle diameter of about 1 nanometer to about 200 nanometers, preferably from about 1 nanometer to about 100 nanometers, more preferably from about 2 nanometers to about 75 nanometers. These size ranges facilitate ease of dispersion of the colloidal inorganic oxide particles into the ceramer composition and provide ceramer composites that are smoothly surfaced and optically clear. Average particle size of the colloidal inorganic oxide particles can be measured using transmission electron microscopy to count the number of colloidal inorganic oxide particles of a given diameter.

A wide range of colloidal inorganic oxide particles can be used in the ceramer compositions of the present invention. Representative examples include colloidal silica, colloidal titania, colloidal alumina, colloidal zirconia, colloidal vanadia, colloidal chromia, colloidal iron oxide, colloidal antimony oxide, colloidal tin oxide, and mixtures thereof. The colloidal inorganic oxide particles can comprise essentially a single oxide such as silica, a combination of oxides, such as silica and aluminum oxide, or a core of an oxide of one type (or a core of a material other than a metal oxide) on which is deposited an oxide of another type.

In one preferred embodiment, for example, the colloidal inorganic oxide particles advantageously may comprise a major amount of a first plurality of primary colloidal inorganic oxide particles, e.g., silica, and a minor amount of a second plurality of one or more other colloidal inorganic oxide particles (i.e., "additive oxide(s)"), preferably an aluminum oxide. As used herein, "major amount" means that the colloidal inorganic oxide particles include at least 60% by weight, preferably about 80% by weight, more preferably at least about 95% by weight, most preferably at least about 98% by weight of that component based on the total weight of the particles. "Minor amount" means that the colloidal inorganic oxide particles include up to 40% by weight, preferably up to 20% by weight, more preferably up to 5% by weight, most preferably up to about 2% by weight of that component based on the total weight of the particles.

The optimum amount of an additive colloidal inorganic oxide particles to be incorporated into a ceramer composition will depend upon a number of factors including the type(s) of additive colloidal inorganic oxide particle(s) being used, the desired end use of the ceramer composition, and the like. Generally, if too little of the additive colloidal inorganic oxide particles is used, the resultant cured ceramer composite may become more hazy than desired. It is additionally possible that the level of abrasion resistance may also be unduly reduced. As a guideline, particularly preferred ceramer compositions may include about 100 parts by weight of silica, i.e., primary colloidal inorganic oxide particles, and from about 0.01 to about 10, preferably from about 1 to about 2 parts by weight of an oxide other than silica, preferably an aluminum oxide, i.e., additive colloidal inorganic oxide particles.

The colloidal inorganic oxide particles are desirably provided in the form of a sol (e.g., colloidal dispersions of inorganic oxide particles in liquid media), especially aqueous sols of amorphous silica. Unlike other forms in which the colloidal inorganic oxide particles may be supplied (e.g., fumed silica which comprises irregular aggregates of colloidal particles), colloidal inorganic oxide particles supplied in the form of sols tend to be substantially monodisperse in size and shape. Thus, ceramer compositions prepared utilizing such sols exhibiting good optical clarity and smoothness as well as surprisingly good adhesion to substrates. Preferred sols generally contain from about 2 to about 50 weight percent, preferably from about 25 to about 45 weight percent, of colloidal inorganic oxide particles based on the total weight of the sol.

Sols useful in the practice of the present invention may be prepared by methods well known in the art. For example, silica hydrosols comprising from about 2 to about 50 percent by weight of silica in water are generally useful and can be prepared, e.g., by partially neutralizing an aqueous solution of an alkali metal silicate with acid to a pH of about 8 or 9 (such that the resulting sodium content of the solution is less than about 1 percent by weight based on sodium oxide). Sols useful in the practice of the present invention may also be prepared in a variety of forms, including hydrosols (where water serves as the liquid medium), organosols (where organic liquids are used as the liquid medium), and mixed sols (where the liquid medium comprises both water and an organic liquid). See, e.g., the descriptions of the techniques and forms given in U.S. Pat. Nos. 2,801,185 (Iler) and 4,522,958 (Das et al.), which descriptions are incorporated herein by reference, as well as those given by R. K. Iler in *The Chemistry of Silica*, John Wiley & Sons, New York (1979).

Due to their low cost, surface chemistry, and environmental considerations, silica hydrosols, i.e., aqueous silica sols, are preferred for use in preparing the ceramer compositions of the present invention. More particularly, when the colloidal inorganic oxide particles are dispersed in water, the colloidal inorganic oxide particles are stabilized to some degree due to common electrical charges that develop on the surface of each particle. The common electrical charges tend to promote dispersion rather than agglomeration and/or flocculation of the colloidal inorganic oxide particles, because the similarly charged particles repel one another. In embodiments of the invention in which the colloidal inorganic oxide particles are provided as a sol, the sol preferably includes from about 2 to about 50, preferably from about 20 to about 50 percent by weight of the colloidal inorganic oxide particles.

Although either acidic or basic sols are suitable for use in the ceramer compositions of the present invention, it is desirable to match the pH of the sol with that of the free-radically curable binder precursor in order to minimize the tendency of the colloidal inorganic oxide particles of the sol to flocculate when the sol and the free-radically curable binder precursor are combined. For example, if the sol is acidic, the free-radically curable binder precursor is also preferably acidic. On the other hand, if the sol is basic, the free-radically curable binder precursor is also preferably basic.

In one preferred embodiment of the ceramer composition of the present invention to be derived from an aqueous silica sol, it may be desirable to add a minor amount of a water soluble compound such as sodium aluminate ($NaAlO_2$) to the sol. Addition of a compound such as sodium aluminate provides a sol, and corresponding ceramer composition, that include both silica particles and aluminum oxide particles. As described above, the use of additive colloidal inorganic oxide particles, such as aluminum oxide, makes it easier to obtain homogeneous ceramer compositions and provides the resulting ceramer composites with improved abrasion resistance as well as improved substrate adhesion in wet or dry environments. Although not wishing to be bound by any theory, it is believed that these beneficial results may be attributed to the enhanced hydrolytic stability that is exhibited by ceramer composites that include amounts of both primary and additive colloidal inorganic oxide particles.

The sols of the present invention may optionally include counter ions in order to counter the surface charge of the colloidal inorganic oxide particles. Depending upon pH and the kind of colloidal inorganic oxide particles being used, the surface charges on the colloidal inorganic oxide particles can be negative or positive. Thus, either cations or anions are used as counter ions. Examples of cations suitable for use as counter ions for negatively charged colloidal inorganic oxide particles include Na$^+$, K$^+$, Li$^+$, a quaternary ammonium cation such as NR'$_4$$^+$, wherein each R' may be any monovalent moiety, but is preferably H or lower alkyl groups, such as CH$_3$, combinations of these, and the like. Examples of counter anions suitable for use as counter ions for positively charged colloidal inorganic oxide particles include SO$_4$$^{2-}$ and HSO$_3$$^-$.

The free-radically curable fluorochemical components utilized in the ceramer composition may be successfully incorporated into the ceramer composition of the present invention without resulting in colloid flocculation and/or phase separation of the ceramer compositions. Additionally, the ceramer composition, upon curing, provides a ceramer composite with the desired hardness, optical clarity, stain, oil and/or water repellency characteristics. The surface treated colloidal inorganic oxide particles are used to improve the compatibility or reactivity between the particles and other ingredients in the ceramer composition. Surface treatment generally involves reacting a sol containing the colloidal inorganic oxide particles with a surface treatment agent such that the surface treatment agent interacts with and bonds to the surfaces of the colloidal inorganic oxide particles. This procedure will be described and illustrated below, particularly in the Examples.

The ceramer composition of the present invention is generally compatible with a wide variety of known surface treatment agents. Generally, suitable surface treatment agents for use in the ceramer composition of the present invention include one or more hydrolyzable organofunctional silane moiety and one or more free radically curable moiety. Such compounds are also referred to as "silane coupling agents". Examples of silane coupling agents include acryloxyalkyl trimethoxysilane, methacryloxyalkyl trimethoxysilane, (meth)acryloxyalkyl triethoxysilane, (meth)acryloxyalkyl trichlorosilane, vinyl trimethoxysilane, vinyl triethoxysilane, vinyl trichlorosilane, and mixtures thereof. Advantageously, silane coupling agents such as these that include free radically curable functionality interact with the particles so as to functionalize the particles with free radical curing capability. Such particles can become co-cross-linked with the binder precursor upon exposure to curing energy.

Curable silane components suitable for use in the ceramer compositions of the present invention may be polymers, oligomers, or monomers and may preferably be represented by the formula:

  (17)

In Formula (17), each S$_y$ independently represents a hydrolyzable silane moiety as defined above with respect to Formula (7); each R$_A$ independently is a free-radically curable moiety as described above with respect to Formula (1); q is at least 1, preferably 1 to 4, more preferably 1; p is at least 1, preferably 1 to 4, more preferably 1; and W is a linking group having a valency of q+p. Other than the differences in valent sites and the moieties to be linked, W is as defined above with relation to Formula (1). Compounds according to Formula (17) and methods of making such compounds are described in U.S. Pat. No. 5,314,980, the disclosure of which is incorporated by reference herein.

Embodiments of compounds according to Formula (17) in the form of silane functional (meth)acrylates include, for example, 3-(methacryloxy)propyl trimethoxysilane, 3-acryloxypropyl trimethoxysilane, 3-(methacryloxy)propyltriethoxysilane, 3-(methacryloxy)propylmethyldimethoxysilane, 3-(acryloxypropyl)methyldimethoxysilane, 3-(methacryloxy)propyldimethylethoxysilane, 3-(methacryloxy)methyltriethoxysilane, 3-(methacryloxy)methyltrimethoxysilane, 3-(methacryloxy)propyldimethylethoxysilane, 3-methacryloxypropenyl trimethoxysilane, vinyldimethylethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltrisisobutoxysilane, vinyltriisopropenoxysilane, vinyltris(2-methoxyethoxy)silane, and mixtures thereof. Of these, 3-(methacryloxy)propyl trimethoxysilane, 3-acryloxypropyl trimethoxysilane, 3-(methacryloxy)propylmethyldimethoxysilane and 3-(methacryloxy)propyldimethylethoxysilane are preferred. Furthermore, embodiments of curable silane components according to Formula (15) in the form of silane functional polyolefins can be produced from commercially available starting materials by any of several methods.

Examples of curable silane components are described in E. P. Pleuddeman, "Silane Coupling Agents", Plenum Press: New York, 1982, pp. 20–23 and 97; U.S. Pat. Nos. 4,491,508 and 4,455,205 to Olsen et al.; U.S. Pat. Nos. 4,478,876 and 4,486,504 to Chung; and U.S. Pat. No. 5,258,225 to Katsamberis, all of which are incorporated herein by reference.

It is preferred that the surface treated colloidal inorganic oxide particles are additionally treated with a surface treatment agent that further enhances the stain, oil, and water repellency of the resultant ceramer composite. Preferably, such an additional surface treatment agent comprises a fluoro/silane component in addition to a curable silane component. It is further preferred that the fluoro/silane component of such a multi-component surface treatment agent comprises at least one hydrolyzable silane moiety and at least one fluorinated moiety and furthermore, that the curable silane component comprises at least one hydrolyzable silane moiety and at least one free radically curable moiety. In embodiments where the colloidal inorganic oxide particles are surface treated in this way, it is preferred that the ceramer composition comprises from about 4 to about 20 parts by weight of the curable silane component per 1 part by weight of the fluoro/silane component, 100 parts by weight of the free-radically curable binder precursor per 10 to 100 parts by weight of the colloidal inorganic oxide particles, and from about 1 to about 20 parts by weight of the curable silane and fluoro/silane components per 100 parts by weight of the colloidal inorganic oxide particles.

Suitable fluoro/silane components include those having at least one hydrolyzable or hydrolyzed group and a fluorochemical group. Additionally, suitable fluoro/silane components can be polymers, oligomers, or monomers and typically comprise one or more fluorochemical moieties that contain a fluorinated carbon chain having from 3 to about 20 carbon atoms, more preferably from about 6 to about 14 carbon atoms. The fluorochemical moiety may be linear, branched, or cyclic or any combination thereof. The fluorochemical moiety preferably is free of curable olefinic unsaturation but can optionally contain in-chain heteroatoms such as oxygen, divalent or hexavalent sulfur, or nitrogen. Perfluorinated groups are preferred, but hydrogen or halogen atoms can also be present as substituents, provided that no more than one atom of either is present for every two carbon atoms.

A class of useful fluoro/silane components can be represented by the following general formula:

$$(S_y)_r\text{—W—}(R_f)_s \tag{7}$$

In Formula (7), each $S_y$ independently represents a hydrolyzable silane moiety, $R_f$ is as defined above with relation to Formula (1), r is at least 1, preferably 1–4, more preferably 1; s is at least 1, preferably 1–4, more preferably 1; and W is a linking group having r+s valent sites. Other than the differences in valent sites and the moieties to be linked, W is as defined above with relation to Formula (1).

Preferably, each $S_y$ moiety of Formula (7) independently is a monovalent or divalent, nonionic hydrolyzable silane moiety that may be linear, branched, or cyclic. In the practice of the present invention, the term "hydrolyzable silane moiety" with respect to $S_y$ refers to a hydrolyzable silane moiety comprising at least one Si atom bonded to at least one halogen atom and/or at least one oxygen atom in which the oxygen atom preferably is a constituent of an acyloxy group and/or an alkoxy group. Thus, representative examples of preferred hydrolyzable silane moieties suitable for use as $S_y$ may be represented by the following formulae:

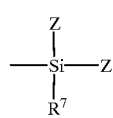
(8)

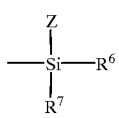
(9)

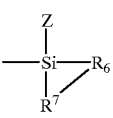
(10)

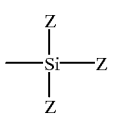
(11)

Generally, each $R^6$ and $R^7$ independently may be any nonionic, monovalent substituent other than hydrogen. Additionally, $R^6$ and $R^7$ may be linear, branched, or cyclic. In embodiments according to Formula (9), $R^6$ and $R^7$ may be co-members of a ring structure. Thus, representative examples of moieties suitable for use as $R^6$ and $R^7$ include any alkyl, aryl, alkaryl, acyl, alkenyl, arylene and/or heterocyclic moieties, combinations thereof, or the like. Any of such moieties, if cyclic, may include a plurality of rings if desired. For example, aryl moieties may be aryl-aryl structures. Preferably each of $R^6$ and $R^7$ independently is a lower alkyl group of 1 to 4 carbon atoms, more preferably $CH_3$—.

Z is preferably a halogen atom or —$OR^8$. In embodiments in which —$OR^8$ is an alkoxy group, $R^8$ preferably is an alkyl group of 1 to 8, preferably 1 to 4, more preferably 1 to 2 carbon atoms. In embodiments in which —$OR^8$ is an acyloxy group, $R^8$ preferably has the formula —$C(O)R^9$, wherein $R^9$ generally may be any nonionic, monovalent moiety other than hydrogen. Representative examples of moieties suitable for use as $R^9$ include any alkyl, aryl, or alkaryl moieties, and combinations thereof. Any of such $R^9$ moieties, if cyclic, may include a plurality of rings if desired. In preferred embodiments, $R^9$ is $CH_3$—.

A preferred class of compounds according to Formula (7) are represented by any of the formulae

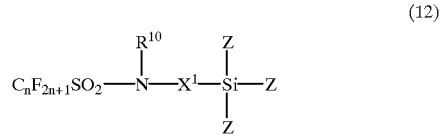
(12)

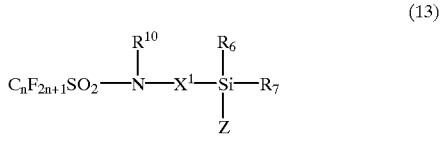
(13)

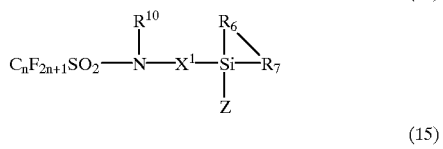
(14)

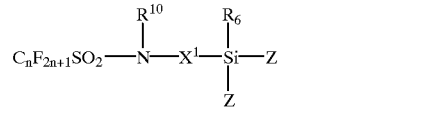
(15)

wherein n is 1 to 20, preferably 3 to 20; $R^{10}$ is a monovalent moiety, preferably an aryl, alkyl, or alkyaryl moiety, more preferably an alkyl moiety of 1 to 4 carbon atoms; Z, $R^6$, $R^7$ and $R^8$ are as defined above; and $X^1$ is a divalent linking group as described above with respect to Formula (4).

Representative specific examples of preferred compounds according to Formula (6) include the following compounds:

$C_5F_{11}CH_2OCH_2CH_2CH_2Si(OCH_2CH_3)_3$ $C_7F_{15}CH_2CH_2CH_2CH_2Si(OCH_2CH_3)_3$ $C_7F_{15}CH_2OCH_2CH_2CH_2SiCl_3$ $C_8F_{17}CH_2CH_2OCH_2CH_2CH_2SiCl_3$ $C_{18}F_{37}CH_2OCH_2CH_2CH_2CH_2SiCl_3$ $CF_3CF(CF_2Cl)CF_2CF_2SO_2N(CH_3)CH_2CH_2CH_2SiCl_3$ $C_8F_{17}SO_2N(CH_2CH_3)CH_2CH_2CH_2Si(OCH_3)_3$ $C_8F_{17}SO_2N(CH_3)CH_2CH_2CH_2Si(OCH_3)_3$ $C_8F_{17}SO_2N(CH_2CH_3)CH_2CH_2CH_2Si(OCH_3)_{av1},9[(OCH_2CH_2)_{av6.1}OCH_3]_{av1.1}$ $C_7F_{15}CH_2O(CH_2)_3Si(OCH_2CH_2OCH_2CH_2OH)_3$ $C_7F_{15}CH_2CH_2Si(CH_3)Cl_2$ $C_8F_{17}CH_2CH_2SiCl_3$ $C_3SiCH_2CH_2CH_2OCH_2CF_2(OCF_2CF_2)_8OCF_2CH_2OCH_2CH_2CH_2SiCl_3$ $CF_3O(CF_2CF(CF_3)O)_4CF_2C(=O)NHCH_2CH_2CH_2Si(OC_2H_5)_3$ $CF_3O(C_3F_6O)_4(CF_2O)_3CF_2CH_2OC(=O)NHCH_2CH_2CH_2Si(OCH_3)_3$ $Cl_3SiCH_2CH_2OCH_2(CF_2CF_2O)_8(CF_2O)_4CF_2CH_2CH_2CH_2SiCl_3$ $C_8F_{17}CONHC_6H_4Si(OCH_3)_3$ $C_8F_{17}SO_2N(CH_2CH_3)CH_2CH_2CH_2Si(OCH_3)_{av1}(OCH_2CH_2(OCH_2CH_2)_2OCH_3)_{av2}$

A particularly preferred embodiment of a fluoro/silane component according to Formula (7), for example, is represented by the formula

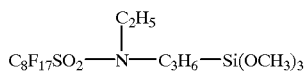

The compound according to Formula (16) is commercially available from Minnesota Mining and Manufacturing Company, St. Paul, Minn. under the trade designation FC-405. Methods of making such a compound and fluorolsilane compounds in general are described in U.S. Pat. No. 3,787,467 to Lucking et al., the disclosure of which is herein incorporated by reference.

Useful fluoro/silane components can be prepared, e.g., by reacting (a) at least one fluorochemical compound having at least one reactive functional group with (b) a functionalized silane having from one to about three hydrolyzable groups and at least one alkyl, aryl, or alkoxyalkyl group that is substituted by at least one functional group that is capable of reacting with the functional group of the fluorochemical compound(s). Such methods are disclosed in U.S. Pat. No. 5,274,159 (Pellerite et al.).

Curable silane components suitable for use as an optional surface treatment agent in the ceramer composition of the present invention are commercially available from numerous sources. Generally, suitable curable silane components comprise at least one hydrolyzable silane moiety and at least one curable moiety. The curable moiety preferably contains either (meth)acrylate, allyl, styryl, amino, or epoxy functionalities, while the hydrolyzable silane group is usually an alkoxy silyl moiety (generally methoxy or ethoxy) which serves as a binding site to hydroxy-functional inorganic substrates via displacement of the alkoxy groups. Additional information concerning curable silane components may be found in the book by E. P. Pleuddeman ("Silane coupling Agents", Plenum Press: New York, 1982, pp. 20–23 and 97) as well as in technical reports by S. Sterman and J. G. Marsden entitled "Theory of Mechanisms of Silane Coupling Agents in Glass Reinforced and Filled Thermoplastic and Thermosetting Resin Systems", Union Carbide Corporation, New York, and "A Guide to Dow Coming Silane Coupling Agents", Dow Coming Corporation, 1985, pp. 2–13, the disclosures of which are incorporated by reference herein.

In addition to the free-radically curable binder precursor, the colloidal inorganic oxide particles, and optionally, the surface treatment agent, the ceramer composition may further include other optional additives as well known in the art. For example, if desired, the ceramer composition may include solvents, surfactants, antistatic agents, leveling agents, initiators, photosensitizers, stabilizers, absorbers, antioxidants, crosslinking agents, fillers, fibers, lubricants, pigments, dyes, plasticizers, suspending agents and the like.

It may be desirable to include a solvent or dispersant in the ceramer composition to reduce the viscosity of the ceramer composition in order to enhance the coating characteristics of the ceramer composition. The appropriate viscosity level depends upon various factors such as the desired thickness of the coating, application technique, and the type of substrate material onto which the ceramer composition is applied. In general, the viscosity of the ceramer composition at 25° C. is from about 1 to about 200 centipoise, preferably from about 3 to about 75 centipoise, more preferably from about 4 to about 50 centipoise, and most preferably from about 5 to about 20 centipoise when measured using a Brookfield viscometer with a No. 2 spindle at a spindle speed of 20 rpm. In general, a sufficient amount of solvent is used such that the solids content of the ceramer composition is from about 5 to about 99%, preferably from about 10 to about 70%, more preferably from about 15 to about 50%.

The solvent should be selected such that the solvent does not adversely affect the curing properties of the ceramer composition or attack the material of the substrate. Additionally, the solvent should be chosen such that the addition of the solvent to the ceramer composition does not result in colloid flocculation. Furthermore, the solvent should be selected such that it has an appropriate drying rate. That is, the solvent should not dry too slowly, which would slow down the process of making a ceramer composite structure. It should also not dry too quickly, which could cause defects such as pinholes or craters in the resultant ceramer composite. The solvent can be an organic solvent, water, or combinations thereof. Representative examples of suitable solvents include lower alcohols such as ethanol, methanol, isopropyl alcohol, and n-butanol; ketones such as methyl ethyl ketone and methyl isobutyl ketone; glycols; glycol ethers; combinations thereof, and the like. Most preferably, the solvent is isopropanol. Using the procedure described below for making a ceramer composition, the solvent may also include a small amount, e.g. about 2% by weight, of water, based on the total weight of the solvent.

If the ceramer composition does not properly wet the desired substrate, the cured ceramer composite that results upon curing can contain visual imperfections, e.g., pinholes and/or ridges. Thus, the ceramer compositions of the present invention also may include a leveling agent to improve the flow or wetting of the ceramer composition onto the substrate. Examples of leveling agents include, but are not limited to, alkylene oxide terminated polysiloxanes, such as those available under the trade designation "DOW 57" (a mixture of dimethyl-, methyl-, and (polyethylene oxide acetate-capped) siloxane) from Dow Corning, Midland, Mich.; and fluorochemical surfactants such as those available under the trade designations "FC430", and "FC431", from Minnesota Mining and Manufacturing Company Co., St. Paul, Minn. Combinations of different leveling agents can be used if desired. Preferably, if a leveling agent is to be included in the ceramer composition, the leveling agent is present in an amount effective to improve the flow and wetting characteristics of the ceramer composition. Generally, the leveling agent will be effective to impart these desired characteristics in amounts of up to about 3% by weight, and more preferably from about 0.5 to about 1%, based on the total weight of the ceramer composition solids.

Depending upon the energy source used to cure the ceramer composition of the present invention, an initiator may be required to generate the free radicals which initiate polymerization. Thus, the ceramer compositions of the present invention may also optionally include an initiator. Examples of suitable free radical initiators that generate a free radical source when exposed to thermal energy include, but are not limited to, peroxides such as benzoyl peroxide, azo compounds, benzophenones, and quinones. Examples of photoinitiators that generate a free radical source when exposed to visible light radiation include, but are not limited to, camphorquinones/alkyl amino benzoate mixtures. Examples of photoinitiators that generate a free radical source when exposed to ultraviolet light include, but are not limited to, organic peroxides, azo compounds, quinones, benzophenones, nitroso compounds, acryl halides, hydrozones, mercapto compounds, pyrylium compounds, triacrylimidazoles, bisimidazoles, chloroalkytriazines, benzoin, benzoin methyl ether, benzoin ethyl ether, benzoin isopropyl ether, benzoin isobutyl ethers and methylbenzoin, diketones such as benzil and diacetyl, phenones such as acetophenone, 2,2,2-tri-bromo-1-phenylethanone, 2,2-diethoxyacetophenone, 2,2-dimethoxy-2-phenylacetophenone, 2,2,2,-tribromo-1(2-nitrophenyl) ethanone, benzophenone, 4,4-bis(dimethyamino) benzophenone, and acyl phosphates. Examples of commercially available ultraviolet photoinitiators include those available under the trade designations "IRGACURE 184" (1-hydroxycyclohexyl phenyl ketone), "IRGACURE 361" and "DAROCUR 1173" (2-hydroxy-2-methyl-1-phenyl-propan-1-one) from Ciba-Geigy. Typically, if used, an amount of an initiator is included in the ceramer composition to effect the desired level and rate of cure. Preferably, the initiator is used in an amount of from about 0.1 to about 10%, and more preferably from about 2 to about 4% by weight, based on the total weight of the ceramer composition without solvent. It should be understood that combinations of different initiators can be used if desired.

In addition to the initiator, the ceramer composition of the present invention can include a photosensitizer. The photosensitizer aids in the formation of free radicals that initiate curing of the curable binder precursors, especially in an air atmosphere. Suitable photosensitizers include, but are not limited to, aromatic ketones and tertiary amines. Suitable aromatic ketones include, but are not limited to, benzophenone, acetophenone, benzil, benzaldehyde, and o-chlorobenzaldehyde, xanthone, thioxanthone, 9,10-anthraquinone, and many other aromatic ketones. Suitable tertiary amines include, but are not limited to, methyldiethanolamine, ethyldiethanolamine, triethanolamine, phenylmethyl-ethanolamine, dimethylaminoethylbenzoate, and the like. Typically, if used, an amount of photosensitizer is included in the ceramer compositions to effect the desired level and rate of cure. Preferably, the amount of photosensitizer used in the ceramer compositions of the present invention is about 0.01–10%, more preferably about 0.05–5%, and most preferably about 0.25–3% by weight, based on the total weight of the ceramer composition solids. It should be understood that combinations of different photosensitizers can be used if desired.

Both ultraviolet stabilizers and ultraviolet absorbers can improve the weatherability and reduce the time-induced discoloration of the ceramer composition. An example of an ultraviolet absorber suitable for use in the ceramer composition of the present invention is that commercially available under the trade designation "TINUVIN 1130" (hydroxyphenyl benzotriazole) and an example of an hindered amine light stabilizer suitable for use in the ceramer composition of the present invention is that commercially available under the trade designation "TINUVIN 292" (bis (1,2,2,6,6-pentamethyl-4-piperidinyl)sebacate), both of which are available from Ciba-Geigy. The ceramer composition can include an amount of a stabilizer, an absorber, or a combination thereof to impart the desired result. Preferably, the ultraviolet stabilizer and/or absorber is present in an amount up to about 10% by weight, and more preferably about 1–5%, based on the total weight of the ceramer composition solids. It should be understood that combinations of different ultraviolet stabilizers and absorbers can be used if desired.

An ozone stabilizer protects against degradation resulting from reaction with ozone. Examples of ozone stabilizers include, but are not limited to, hindered amines such as that available under the trade designation "IRGANOX 1010" from Ciba-Geigy and phenothiazine commercially available from Aldrich Chemical Company, Inc., Milwaukee, Wis. The ceramer composition can include an amount of an ozone stabilizer to impart the desired result. Preferably, the ozone stabilizer is present in an amount up to about 1% by weight, more preferably from about 0.1 to about 1.0%, and most preferably from about 0.3 to about 0.5%, based on the total weight of the ceramer composition solids. It should be understood that combinations of different ozone stabilizers can be used if desired.

A thermal stabilizer/antioxidant reduces the amount of yellowing as a result of weathering. Examples of such materials include, but are not limited to, low melting hindered phenols and triesters. Specific examples include 2,6-di-tert-butyl-4-methylphenol, commercially available under the trade designation "ULTRANOX 226" from Borg Warner Chemicals, Inc., Parkersburg, N.Y.; octadecyl 3,5-di-tert-butyl-4-hydroxyhydroxcinnamate, commercially available under the trade designations "ISONOX 132" antioxidant from Schenectady Chemicals, Inc., Schenectady, N.Y.; or "VANOX 1320" commercially available from Vanderbilt Co., Inc., Norwalk, Conn. The ceramer composition can include an amount of the thermal stabilizer/antioxidant to impart the desired result. Preferably, the thermal stabilizer/antioxidant is present in an amount up to about 3% by weight, and more preferably about 0.5–1%, based on the total weight of the ceramer composition solids. It should be understood that combinations of different thermal stabilizers/antioxidants can be used if desired.

According to one approach for making a ceramer composition in accordance with the present invention, an aqueous sol of colloidal inorganic oxide particles e.g., silica, is provided. Preferably, the sol should have a pH such that the particles have a negative surface charge. For example, if the particles are silica, the sol should be alkaline with a pH greater than 7, preferably greater than 8, more preferably greater than 9. It is preferred that the sol include ammonium hydroxide or the like so that $NH_4^+$ is available as a counter cation for the particles having the negative surface charge. If surface treatment of the colloidal inorganic oxide particles is desired, a suitable surface treatment agent is then blended into the sol. A preferred method of blending the multicomponent surface treatment agent into the sol is described in assignee's co-pending application U.S. patent application Ser. No. 09/072506 (Kang) filed May 4, 1998, the entirety of which is hereby incorporated by reference. Typically, about 10 parts by weight of the surface treatment agent is used per 100 parts by weight of the colloidal inorganic oxide particles.

The free-radically curable binder precursor, including at least the free-radically curable fluorochemical component, is then added to the ceramer composition. The ceramer composition is then heated, or "stripped" to remove substantially all of the water. For example, removing about 98% of the water, thus leaving about 2% water in the ceramer composition, has been found to be suitable. When the free-radically curable binder precursor comprises free-radically curable prepolymers, the resultant stripped ceramer composition is a clear liquid. As soon as substantially all of the water is removed, an organic solvent of the type described above may be added, if desired, in an amount such that the ceramer composition includes from 5% to about 99% by weight solids (preferably 10 to 70%). After adding the solvent, any other desired optional ingredients, as described above, may be added. Alternatively, the free-radically curable fluorochemical component any be added to the stripped ceramer composition.

The resultant ceramer composition may then be coated onto any substrate for which it is desired to improve the abrasion resistance, impact resistance, stain resistance, oil and/or water repellency, combinations of these, or the like while also maintaining optical clarity if desired. Examples of such substrates include any and all thermosetting or thermoplastic items such as camera lenses, eyeglass lenses, binocular lenses, retroreflective sheeting, automobile windows, building windows, train windows, boat windows, aircraft windows, vehicle headlamps and taillights, display cases, eyeglasses, watercraft hulls, road pavement markings, overhead projectors, stereo cabinet doors, stereo covers, furniture, bus station plastic, television screens, computer screens, watch covers, instrument gauge covers, optical and magneto-optical recording disks, and the like.

Any suitable coating technique can be used for applying the ceramer composition onto the substrate, depending upon the nature of the substrate, the viscosity of the ceramer composition, and the like. Examples of suitable coating techniques include spin coating, gravure coating, flow coating, spray coating, coating with a brush or roller, screen printing, knife coating, curtain coating, extrusion, squeegee coating, and the like. Typical protective ceramer composites of the present invention have a thickness in the range of from about 1 micron to about 100 microns, preferably from about 2 to about 50 microns, more preferably from about 4 to about 9 microns. Generally, composites that are too thin may not have sufficient abrasion and/or impact resistance, and composites that are too thick may tend to be too heavy depending upon the nature of the substrate. Also, thicker composites may have more of a tendency to crack.

After coating, the solvent, if any, is flashed off with heat, vacuum, and/or the like. The coated ceramer composition is then cured by irradiation with a suitable form of energy, such as heat energy, visible light, ultraviolet light or electron beam radiation. Irradiating with ultraviolet light in ambient conditions is presently preferred due to the relative low cost and speed of this curing technique. Irradiation causes the free-radically curable binder precursor, including any free-radically curable prepolymers incorporated therein, to crosslink together to form a ceramer composite comprising a polymer matrix having the colloidal inorganic oxide particles, and the optional additives, if any, interspersed in the polymer matrix. The resultant ceramer composite coated substrate, i.e., a ceramer composite structure in accordance with the present invention, is thereby protected against abrasion resistance, impact resistance, and stain, oil and/or water damage.

The present invention will now be further described with reference to the following Examples. Test procedures used throughout the Examples were as follows:

Test Methods

Test Procedure I: Taber Abrasion Test

This test measures the Taber abrasion of the ceramer composition when coated on a substrate and was performed according to ASTM D1044 (Standard Method for Resistance of Transparent Plastics to Surface Abrasion), the disclosure of which is incorporated herein by reference. Briefly, the test method involved abrading a sample on a TABER ABRASER for 100, 300 and 500 cycles using a 500 gram load with a CS-10F wheel under a load of 500 grams. After 100, 300 and 500 cycles the change in percent haze was measured according to ASTM D1003 using a hazemeter.

Test Procedure II: Warm Water Adhesion Test

This test was designed to test the ceramer composition's durability when coated on a substrate and submersed in water at elevated temperatures. The sample was completely submerged in water at the stated temperature for the stated time period. Specifically, the samples were submerged in water baths at 60° C. for 5 days, at 71° C. for 5 days, at 60° C. for 6 days, and at 82° C. 6 days. At the end of the stated time period, the samples were removed and examined for any delamination. To pass this test, the ceramer coating must not show any delamination from the substrate. In addition, the ceramer composite coating must pass the ASTM 3359-95-A adhesion (cross-hatch) test. The ceramer composite coatings were designated "pass" if:
(i) the edges of the cuts are completely smooth; none of the squares of the lattice is detached; or
(ii) small flakes of the ceramer composite coating are detached at intersections; (less than 5% of the area is affected); or
(iii) small flakes of the ceramer composite coating are detached along edges and at intersections of cuts; (the area affected is 5 to 15% of the lattice).

The ceramer composite coatings were designated "fail" if:
(i) the ceramer composite coating has flaked along the edges and on parts of the squares; (the area affected is 15 to 35% of the lattice); or
(ii) the ceramer composite coating has flaked along the edges of cuts in large ribbons and whole squares have been detached; (the area affected is 35 to 65% of the lattice).

Test Procedure III: Weatherability

This test assesses the ability of the ceramer composition, when coated on a substrate, to withstand weathering conditions (e.g., sunlight and moisture). The test was conducted according to ASTM Test Standard G-26-88, Type B, BH (Standard Practice for Operating Light Exposure Apparatus (Xenon-Arc Type) with and without water for Exposure of Nonmetallic Materials), the disclosure of which is incorporated by reference herein.

Briefly, a sample was subjected to accelerated weathering in a Model 65XWWR Weathering Chamber, available from Atlas Electric Devices Co. (Chicago, Ill.). The light source was a 6500 watt, water cooled, xenon arc, filtered by borosilicate inner and outer filters. The irradiance was $0.35 W/m^2$. The sample went through repetitive cycles of 102 minutes of light exposure at 63° C. black panel and 18 minutes of light exposure with a water spray.

Samples were inspected every 500 to 700 hours until undesirable effects were noted. Undesirable effect obtained from this weathering test include, in particular, whitening, yellowing, delamination, and "checks", which are imperfections in the form of slight inclusions in the ceramer composite.

Test Procedure IV: "Pen Test"

A fine line of approximately 3 centimeters was drawn using a black SHARPE™ fine point permanent marker (available from the Sanford Corporation, Bellwood, Ill.) on a substrate coated with a ceramer composite coating. A number value of 0 to 3 was assigned based on the appearance of the resulting line. The values were defined as follows:

3 = totally unwettable, ink dewets to form a discontinuous line (best);
2 = ink partially dewets to form a very thin continuous line;
1 = some dewetting;
0 = totally wettable, same as non-treated surface (worst)

Abbreviations
The following abbreviations, trade names, and trademarks were used in the examples:

| | |
|---|---|
| A-174 | 3-Methacryloxypropyltrimethoxysilane available from Union Carbide |
| BHT | 2,6-Di-tert-butyl-4-methylphenol |
| BuFOSEA | $C_8F_{17}SO_2N(C_4H_9)(C_2H_4OCOCH=CH_2)$, available as FX-189 from 3M Company |

-continued

| | |
|---|---|
| EtFOSEA | N-ethylperfluorooctylsulfonamidoethylacrylate, $C_8F_{17}SO_2N(C_2H_5)(C_2H_4OCOCH=CH_2)$ |
| EHAA | $C_4F_9CF(C_2F_5)COOCH_2C(C_2H_5)(CH_2OCOCH=CH_2)_2$ |
| FBSEEAA | Perfluorobutylsulfonamido-bis-ethylacrylate, $C_4F_9SO_2N(C_2H_4OCOCH=CH_2)_2$ |
| FC-405 | $C_8F_{17}SO_2N(C_2H_5)C_3H_6Si(OCH_3)_3$ |
| FOEA | $C_nF_{2n-1}C_2H_4OCOCH=CH_2$, where n is a 60:40 mixture of 8 and 10, available from Hoechst as FLUOWET AC-812. |
| FOSEE | N,N-bis(hydroxyethyl)-perfluoro octanesulfonamide |
| FOSEEAA | Perfluorooctylsulfonamido-bis-ethylacrylate, $C_8F_{17}SO_2N(C_2H_4OCOCH=CH_2)_2$ |
| Irgacure 184 | 1-Hydroxycyclohexyl phenyl ketone, available as Irgacure 184 from Ciba Geigy Corp., Hawthorne, NY |
| MeFOSEA | N-methylperfluorooctylsulfonamidoethylacrylate, $C_8F_{17}SO_2N(CH_3)(C_2H_4OCOCH=CH_2)$ |
| Pergo ™ flooring | A melamine laminate available from Perstop Flooring, Raleigh, NC |
| PET | Polyethylene terephthalate film |
| PETA | Pentaerythritol triacrylate |
| PMMA | Polymethylmethacrylate sheeting available as Cyro-FF ™ from Cyro Inc |
| Polycarbonate | Available as Cyro-ZX ™ sheeting from Cyro Inc. |
| Tinuvin 292 | Bis-(1,2,2,6,6-pentamethyl-4-piperidinyl)sebacate, a hindered amine light stabilizer available from Ciba Specialty Chemicals, White Plains, NY |
| 3,8,3AA | $(CF_{32}CFCH(OCOCH=CH_2)(CF_2)_8CH(OCOCH=CH_2)CF(CF_3)_2$ |

Preparation of Fluorochemical Acrylates
Preparation of $C_8F_{17}SO_2N(C_2H_4OCOCH=CH_2)_2$
Perfluorooctanesulfonamido-bis-ethylacrylate, "FOSEEAA"

A mixture of 200.0 grams (0.34 mole) N,N-bis(hydroxyethyl)-perfluoro octanesulfonamide (FOSEE), 66 grams acrylic acid, 5.0 grams IR 120 Plus™ acidic ion exchange resin (available from Aldrich Fine Chemicals), 0.0186 gram phenothiazine, and 750 ml heptane was stirred at reflux under a Dean-Stark water trap. After 2 hours, about 5 ml water along with clear gel had collected. Additional acrylic acid (23.4 grams) was added at four hours, and reflux was continued for 2 hours. The reaction mixture was sampled, and NMR analysis indicated 71% conversion of starting material. The reaction was continued after adding 25 grams acrylic acid and 2.0 grams IR120 Plus™. After 3 hours of further refluxing, conversion was found to be >97%. The mixture was filtered and sequentially washed with water, dilute sodium hydroxide, and water. The organic layer was dried with anhydrous magnesium sulfate and evaporated under reduced pressure to 195.5 grams of tan viscous liquid.

Preparation of $C_4F_9CF(C_2F_5)COOCH_2C(C_2H_5)(CH_2OCOCH=CH_2)_2$ "EHAA"

A mixture of 176.0 grams 2,4-diethyl-4-hydroxymethyl-2-methyl-1,3-dioxane, 117 grams triethylamine, and 500 ml methylene chloride was cooled in an ice bath and treated dropwise with 406 grams of $C_4F_9CF(C_2F_5)COF$ (b.p. 103° C., from direct fluorination of 2-ethylhexyl acetate). The mixture was left at room temperature over the weekend, washed with 5% sulfuric acid, washed with water, stripped, and distilled to 514 grams of tan oil (b.p. 110–150° C./1.2 mm Hg). This was stirred at reflux with 100 ml 10% hydrochloric acid and 100 ml methanol for 2 days. The progress of the hydrolysis reaction was followed by gas-liquid chromatography (glc) and NMR. The resulting oil was dissolved in 100 ml methylene chloride, washed thrice with water, and heated to 125° C. at 0.5 mm Hg, leaving a residue of 426 grams of $C_4F_9CF(C_2F_5)COCH_2C(C_2H_5)(CH_2OH)_2$ a light brown liquid.

A mixture of 26.5 grams (0.05 mole) of the diol, 15.2 gram triethylamine, 25 ml methylene chloride, and 25 ml methyl perfluorobutyl ether was treated with 9.2 ml acryloyl chloride in 10 ml methylene chloride, and stirred overnight. The mixture was washed with water, and the organic solution was treated with a few grains of phenothiazine, dried with anhydrous magnesium sulfate, and stripped to yield a tan liquid (27.5 grams), shown by NMR and IR analysis to be the desired compound.

Preparation of $(CF_3)_2CFCH(OCOCH=CH_2)(CF2)_8CH(OCOCH=CH_2)CF(CF_3)_2$
3,12-dihydroperfluoro-2-13-bis-trifluoromethyl-3,12-bis-acryoyloxytetradecane, "3,8,3AA"

Perfluoro-1,10-decanedioic acid difluoride (50.8 g) (from direct fluorination of decanediol diacetate, treatment with pyridine, and distillation) was added to a dried 600 ml steel Parr™ reactor containing 0.6 g spray-dried potassium fluoride and 0.1 g Adogen™ 464 in 54 g dry diglyme. The reactor was sealed, immersed in a dry ice bath, and 33 g hexafluoropropylene was charged as a gas. The reactor was allowed to warm overnight (pressure=49 psig (338 kPa) and then heated with stirring at 55° C. (following an initial surge to 90°C.). On cooling to room temperature, the pressure fell to 48 psig (331 kPa), indicating no reaction. The reactor was chilled in dry ice, and a solution of 1 g potassium fluoride and 0.5 g Adogen™ 464 in 50 ml diglyme was added. The reactor was then heated at 100–105° C. for about five hours. After cooling, the lower phase was separated (75.6 g), washed in perfluoromethylmorpholine with saturated sodium chloride, dried, and distilled. The resulting diketone, $(CF_3)_2CFC(O)(CF_2)_8C(O)CF(CF_3)_2$, in the amount of 44.6 g, (b.p. 108° C./13 mm Hg) was obtained as a white solid.

To as stirred solution of 32.1 g of the diketone dissolved in 150 ml diglyme was added a mixture of 3.06 g sodium borohydride in 20 ml anhydrous diglyme. This led to thickening and a delayed exotherm. 50 ml diglyme was added and the flask was cooled in ice. After four hours the mixture was sampled for NMR analysis, which indicated complete conversion to the diol, $(CF_3)_2CFCH(OH)(CF_2)_8CH(OH)CF(CF_3)_2$. The mixture was cautiously treated with 5% hydrochloric acid and the lower liquid layer was isolated. The aqueous layer was extracted with diethyl ether, and the extracts were combined with the above liquid. Drying and distillation to a head temperature of 115° C. (1.3 mm Hg) left a waxy solid residue (25.9 g, m.p. 82–90° C.).

A solution of 24 g of the diol in 50 ml acetonitrile was charged with 6.0 g acryloyl chloride and treated dropwise with 6.7 g dry triethylamine. The hydrochloride salt was filtered, and the filtrate was mixed with methylene chloride and washed well with water. After drying and evaporation of the solvent, 22.6 g of a yellow residue was obtained. This was purified by column chromatography on silica gel using 8:1 hexane:ethyl acetate to give 13.5 g of pure diacrylate (3,8,3AA), which solidified on storage at 7° C.

Preparation of $C_8F_{17}SO_2N(C_2H_5)(C_2H_4OCOCH=CH_2)$
N-ethylperfluorooctanesulfonamidoethylacrylate, "EtFOSEA"

EtFOSEA may be made according to Example 1 in U.S. Pat. No. 2,803,615 by substituting ethylamine for n-propylamine.

Preparation of $C_8F_{17}SO_2N(C_2H_5)(C_2H_4OCOCH=CH_2)$
N-methylperfluorooctylsulfonamidoethylacrylate, "MEFOSEA"

Mefosea may be made according to Example 1 in U.S. Pat. 2,803,615 by substituting methylamine for n-propylamine.

Preparation of $C_4F_9SO_2N(C_2H_4OCOCH=CH_2)_2$
Perfluorobutanesulfonamido-bis-ethylacrylate, "FBSEEAA"

A suspension of 38.7 grams (0.1 mole) perfluorobutanesulfonamido-bis-ethanol and 30 grams ethyldiisopropylamine in 150 ml methylene chloride was treated with 50 ml tetrahydrofuran. After the suspension became homogeneous it was cooled in an ice bath, and treated with 18 ml of acryloyl chloride in 20 ml methylene chloride with ice bath cooling. The mixture was washed with water, and the organic solution was treated with a few grains of phenothiazine, dried with anhydrous magnesium sulfate, and the solvent removed under reduced pressure to yield 43.2 grams of a red-brown oil.

EXAMPLE 1

232.6 Parts by weight of the curable binder precursor PETA (pentaerythritol triacrylate) were heated to 49° C. (120° F.) in a one liter flask. 365.2 parts by weight aqueous silica sol (40% solids, 20 nanometers average particle size, commercially available from Nalco Corp., Naperville, Ill., under the trade designation "Nalco 2327") were added to the PETA to form a first admixture. In a separate one liter flask, 33.0 parts by weight of the crosslinkable silane component, A-174, was mixed with 3.5 parts by weight of FOSEEAA, $C_8F_{17}SO_2N[C_2H_4OCOCH=CH_2]_2$, to form a second admixture. The first and second admixtures were then mixed together with 0.36 parts by weight BHT (butylated hydroxytoluene) and 0.04 parts by weight phenothiazine to form a third admixture.

The third admixture was then "stripped", i.e., subjected to a gentle vacuum distillation (100±20 mm Hg) at 52°±2° C. until most of the water/methanol was removed. A residual amount, i.e., a few weight-percent, of water remained in the dried product. At the end of the stripping process, the admixture was diluted to 50% solids with a 14:1 weight-ratio of isopropyl alcohol:distilled water. The resulting homogeneous mixture was diluted to 16.7% solids with a 72.5:8.5:19 weight ratio of isopropyl alcohol:ethanol:n-butanol. About 2.7 parts (per 100 parts by weight of solids composition) IRGACURE™ 184, were also added.

The 16.7% solids ceramer composition was then coated onto polymethyl methacrylate (PMMA) and polycarbonate substrates at a thickness of 4 to 5 micrometers using conventional flow coating techniques. Each coated substrate was then dried at about 72° C. for 7 minutes in an air circulating oven to ensure that the majority of the isopropanol was driven off. Finally, the coating was cured on a conveyor belt of a UV light processor using a high pressure mercury lamp (Model II 180133AN, available from RPC Industries, Plainfield, Ill.). Specifically, the process conditions were as follows: 20 feet/minute, 220 volts, 300 watts/inch$^2$, and atmospheric air.

The resulting ceramer composite coatings were optically clear and adhered to the PMMA and polycarbonate substrates. Furthermore, the resulting ceramer coatings passed the warm water adhesion test on both acrylic and polycarbonate substrates and the weatherability test on the acrylic substrate. Weatherability and Taber abrasion test results are shown in Tables 1 and 2, respectively.

The ceramer compositions prepared in accordance with the above procedure had excellent shelf stability and were clear after 14 months with no apparent flocculation and less than one percent precipitation.

EXAMPLE 2

A coating composition was prepared essentially as in Example 1 with the further addition of 2 parts by weight (for each 100 parts by weight of solids) hindered amine light stabilizer bis-(1,2,2,6,6-pentamethyl-4-piperidinyl)sebacate, commercially available as TINUVIN™ 292 from Ciba Specialty Chemicals, White Plains, N.Y.). The coating composition test results were similar to those found for Example 1, except that weatherability was improved significantly. Taber abrasion and Weatherability test results are shown in Tables 1 and 2, respectively.

TABLE 1

Taber Abrasion Test

| | | Change in Percent Haze | | |
|---|---|---|---|---|
| Sample | Substrate | 100 cycles | 300 cycles | 500 cycles |
| Example 1 | PMMA | 1.8 | 3.3 | 4.5 |
| Example 1 | Polycarbonate | 1.8 | 3.5 | 4.9 |
| Example 2 | PMMA | 2.0 | 3.6 | 4.3 |

The results in Table 1 show that the coatings of Examples 1 and 2 provide excellent abrasion resistance, and that addition of Tinuvin 292 and choice of substrates do not affect the abrasion resistance of these ceramer composite coatings.

COMPARATIVE EXAMPLE A 56.2 parts by weight of the curable binder precursor PETA was heated to 49° C. (120° F.) in a one liter flask. 35.2 parts by weight silica used in Example 1 were added to the PETA to form a first admixture. In a separate one liter flask, 7.7 parts by weight of A-174 was mixed with 0.8 parts by weight of fluoro/silane FC-405 to form a second admixture. The first and second admixtures were then mixed together to form a third admixture.

The third admixture was then "stripped", i.e., subjected to a gentle vacuum distillation (100±20 mm Hg) at 52°±2° C. until most of the water/methanol was removed. A residual amount, i.e., a few weight-percent, of water remained in the product. At the end of the stripping process, the admixture was diluted to 50% solids with a 14:1 weight-ratio of isopropyl alcohol:distilled water. This 50% solids admixture was further diluted to 25% solids with the same solvent mixture. The resulting homogeneous mixture was diluted to 16.7% solids with a 72.5:8.5:19 weight ratio of isopropanol:ethanol:n-butanol. About 2.7 parts by weight photoinitiator per 100 parts solids composition, (IRGACURE™ 184), was also added. A further addition was made of 2 parts by weight (for each 100 parts by weight of solids) hindered amine light stabilizer, TINUVIN™ 292.

The 16.7% solids ceramer composition was then coated onto polymethylmethacrylate and polycarbonate substrates at a thickness of 4 to 5 micrometers by flow coating. Each coated substrate was then flash dried at about 72° C. for 7 minutes in an air circulating oven to ensure that the majority of the solvents was driven off. Finally, the coating was cured as in Example 1.

The resulting ceramer coatings were optically clear and adhered to the polymethylmethacrylate and polycarbonate substrates. The resulting ceramer coatings were subjected to Test Procedure III, Weatherability, and the results are shown in Table 2.

COMPARATIVE EXAMPLE B 56.2 parts by weight of the curable binder precursor PETA was heated to 49° C. (120° F.) in a one liter flask. 35.2 parts by weight of the silica of Example 1 were added to form a first admixture. In a separate one liter flask, 7.7 parts by weight of A-174 was mixed with 8 parts by weight of dimethylacrylamide to form a second admixture. The first and second admixtures were then mixed together to form a third admixture.

The third admixture was then "stripped", i.e., subjected to a gentle vacuum distillation (100±20 mm Hg) at 52°±2° C. until most of the water/methanol was removed. A residual amount, i.e., a few weight-percent, of water remained in the product. At the end of the stripping process, the admixture was diluted to 50% solids with a 14:1 weight-ratio of isopropanol:distilled water. This 50% solids admixture was further diluted to 25% solids with the same solvent mixture. The resulting homogeneous mixture was diluted to 16.7% solids with a 72.5:8.5:19 weight ratio of isopropanol:ethanol:n-butanol. About 2.7 parts by weight photoinitiator per 100 parts solids composition, IRGACURE 184™, was also added. A further addition was made of 2 parts by weight TINUVIN™ 292.

The 16.7% solids ceramer composition was then coated onto polymethylmethacrylate and polycarbonate substrates at a thickness of 4 to 5 micrometers by flow coating. Each coated substrate was then flash dried at about 72° C. for 7 minutes in an air circulating oven to ensure that the majority of the solvents was driven off. Finally, the coating was cured as in Example 1.

The resulting ceramer coatings were optically clear and adhered to the polymethylmethacrylate and polycarbonate substrates. The resulting ceramer coatings were subjected to Test Procedure III, Weatherability, and the results are shown in Table 2.

TABLE 2

Weathering Test

| Example | Substrate | Tinuvin 292 Content | Hours to Failure |
|---|---|---|---|
| 1 | PMMA | 0 | 1613 many micro-checks |
| 2 | PMMA | 2% | 7600 slight whitening |
| 1 | Polycarbonate | 0 | 1070 total delamination |
| Comparative Example A | PMMA | 2% | 5702 slight whitening |
| Comparative Example B | PMMA | 2% | 5790–6602 slight whitening |

The results of Table 2 show that the addition of FOSEEAA and Tinuvin 292 improve weatherability significantly.

EXAMPLE 3

A coating composition was prepared according to Comparative Example A except that the stripped admixture, diluted to 50% solids, was further diluted to 16% solids with isopropanol. Ten grams of this coating composition was combined with 0.2 grams of FOSEEAA and mixed until homogenous. The 16% solids coating compositions with and without FOSEEAA were coated on polyethylene terephthalate (PET) film with a number 22 Meyer rod to a nominal thickness of 8 micrometers when dried. The coatings were dried for 3 minutes at 75° C., and UV-cured in a UV processor (QC Model 120233AN, RPC Industries, Plainfield, Ill.) at low power, and 35 fpm (10.7 m/min) conveyor speed under nitrogen (measured exposure=0.081 mJ/cm$^2$).

When the resulting clear, cured coatings were subjected to Test Procedure IV "Pen Test" it was found that the coating containing FOSEEAA de-wetted more and allowed easier rub-off of the mark when tested repeatedly as compared with the coating without FOSEEAA.

EXAMPLE 4

IRGACURE™ 184 (2.06 grams) was added to 164 grams of the stripped admixture of Comparative Example A, diluted to 46.5% solids. 100 grams of this mixture was diluted to a 10% solids stock solution with 365 grams of isopropanol. A 10% (w/weight of solids) FOSEEAA coating composition was made by mixing 2.58 grams of FOSEEAA with 232.5 grams of the 10% solids stock mixture. A 5% (w/weight of solids) FOSEEAA coating composition was made by mixing equal amounts (w/w) of the stock mixture and the 10% FOSEEAA coating composition.

Each of the FOSEEAA coating compositions was flow coated on polystyrene microbiological assay plates, and on Pergo™ flooring. Each FOSEEAA coating composition was also coated on polyethylene terephthalate film, using a number 22 Meyer bar, to a calculated dry coating thickness of approximately 5 microns. All coatings were dried for 5 minutes at 70° C. and cured as in Example 3. Each of the resulting clear coatings was subjected to Test Procedure W "Pen Test", before and after being rubbed with a Kimwipe™ with isopropanol. All coatings gave an initial "pen test" rating of 3. Coatings on the Pergo™ flooring continued to show a "pen test" of 3 after repeated rubs and re-inking.

EXAMPLES 5–8 AND COMPARATIVE EXAMPLE C

To each of several portions of the 10% solids stock solution of Example 4 was added a fluorinated acrylate in the amount of:

0.051 g/50 g solution to obtain a 1% (w/weight of solids) fluorinated acrylate coating composition, 0.26 g/50 g to obtain 5% fluorinated acrylate coating composition, 0.52 g/50 g to obtain 10% fluorinated acrylate coating composition, and 1.11 g/50 g to obtain 18% fluorinated acrylate coating composition.

The 10% stock solution and these fluorinated acrylate coating compositions were coated onto polyethylene terephthalate film with a number 12 Meyer bar to give a nominal dried thickness of 2.7 microns. All coatings were dried and cured as in Example 4. The resulting clear, cured coatings were characterized by Test Procedure IV "pen test", and the results are shown Table 3.

TABLE 3

Pen Test

| Example | Fluorinated Acrylate | Initial "pen test" Rating |
|---|---|---|
| Comparative Example C | None | 2 |
| 5 | 1% FOSEEAA | 3 |
| 6 | 5% FOSEEAA | 3 |
| 7 | 5% EHAA | 1 |
| 8 | 5% 3,8,3AA | 3 |

The results in Table 3 show a measurable de-wetting effect in the presence of fluorinated acrylates and a particularly significant de-wetting improvement with FOSEEAA and 3,8,3AA.

COMPARATIVE EXAMPLE D

To a portion of the 10% solids stock solution of Example 4 was added BuFOSEA in the amount of 0.0625 g/50 g solution to obtain a 1.25% (w/weight of solids) BuFOSEA coating compostion. This was coated and cured as in Examples 5–8. The cured coating was characterized by Test Procedure IV "pen test" before and after dry rubbing (5–10 strokes with a Kimwipe™) to remove the initial marks. The results are shown in Table 4.

TABLE 4

| Example | Fluorinated Acrylate | Initial "pen test" Rating | "pen test" Rating After Dry Rubbing |
|---|---|---|---|
| Comparative Example D | BuFOSEA | 1 | 0 |

The results in Table 4 show that the initial de-wetting effect of BuFOSEA is small and not durable.

EXAMPLE 9 AND COMPARATIVE EXAMPLE E

The 10% stock solution of Example 4 and a 10% FOSEEAA coating composition, made by mixing 0.52 grams of FOSEEAA with 50 grams of the 10% stock solution of Example 4, were separately flow coated onto PERGO™ flooring, dried, and cured as in Example 4. Using these clear, cured coatings, the durability of the de-wetting effect provided by the fluorinated acrylates was assessed by first rubbing the coatings with dry Kimwipe™ tissues and then rubbing with IPA-soaked Kimwipe™ tissues. Before and after 10 rub cycles, the samples were tested for de-wetting, using Test Procedure IV "pen test". Results are shown in Table 5.

TABLE 5

| Example | Fluorinated Acrylate | Initial "Pen Test" Rating | "Pen Test" Rating After 10 Rub Cycles |
|---|---|---|---|
| Comparative Example E | None | 2 | 0 |
| Example 9 | 10% FOSEEAA | 3 | 3 |

The results shown in Table 5 give evidence that the de-wetting effect of the fluorinated diacrylate is durable.

EXAMPLES 10–15 AND COMPARATIVE EXAMPLE F

Irgacure 184 (2.06 grams) was added to 164 grams of the stripped admixture of Comparative Example B, diluted to 46.5% solids. 100 grams of this mixture was diluted with 365 grams of isopropanol to prepare a 10% solids stock solution. To each of several portions of the 10% solids stock solution was added a fluorinated acrylate in the amount of:

0.051 g/50 g solution to obtain a 1% (w/weight of solids) fluorinated acrylate coating composition,
0.26 g/50 g to obtain 5% fluorinated acrylate coating composition,
0.52 g/50 g to obtain 10% fluorinated acrylate coating composition, and
1.11 g/50 g to obtain 18% fluorinated acrylate coating composition.

The 10% solids stocks solution and these fluorinated acrylate coating composition coating compositions were coated onto polyethylene terrephthalate film with a number 12 Meyer bar to give a nominal thickness of 27 microns. All coatings were dried and cured as in Example 4. The resulting clear, cured coatings were characterized by Test Procedure IV "pen test", and the results are shown in Table 6.

TABLE 6

| Example | Fluorinated Acrylate | Initial "Pen Test" Rating |
|---|---|---|
| Comparative Example F | None | 0 |
| 10 | 5% FOSEEAA | 3 |
| 11 | 5% FBSEAA | 0 |
| 12 | 10% FBSEAA | 1 |
| 13 | 18% FBSEAA | 1 |
| 14 | 5% EHAA | 2 |
| 15 | 5% 3,8,3AA | 1 |

The results shown in Table 6 demonstrate that a number of fluorinated acrylates produce a de-wetting effect in ceramer compositions.

COMPARATIVE EXAMPLES G AND H

To each of two portions of the 10% solids stock solution of Examples 10–15 and Comparative Example F was added BuFOSEA in the amount of: 0.0625 g/50 g solution to obtain a 1.25% (w/weight of solids) BuFOSEA coating composition, and 0.26 g/50 g to obtain a 5% BuFOSEA coating composition. Cured coatings made according to Examples 10–15 and Comparative Example F were characterized by Test Procedure IV "pen test" before and after dry rubbing (5–10 strokes with a Kimwipe™) to remove the initial marks. The results are shown in Table 7.

TABLE 7

| Example | Fluorinated Acrylate | Initial "pen test" Rating | "pen test" Rating After Dry Rubbing |
|---|---|---|---|
| Comparative Example G | 1.25% BuFOSEA | 3 | 0 |
| Comparative Example H | 5% BuFOSEA | 3 | 0 |

The results shown in Table 7 are evidence that the de-wetting effect from BuFOSEA is not durable.

COMPARATIVE EXAMPLES I–N

Coating solutions containing fluorinated acrylates but no ceramer were prepared by first making a 10% trimethylolpropane triacrylate (TMPTA) stock solution in isopropanol wherein 0.13 parts of Irgacure 184 was mixed with 50 parts of an isopropanol solution containing 5 parts TMPTA. Each fluorinated acrylate was then mixed with a portion of the 10% TMPTA stock solution to achieve the fluorinated acrylate content shown in Table 6. The resulting solutions were coated onto polyethylene terephthalate film and Pergo™ flooring, dried, and cured as in Example 4. Each coating was rated for appearance, and tested according to Test Procedure IV "Pen Test" before and after rubs with dry and isopropanol-soaked Kimwipe™ tissues. The results are shown in Table 8.

TABLE 8

| Example | Fluorinated Acrylate | Appearance | Initial "Pen Test" | "Pen Test" After Dry and IPA Rubs |
|---|---|---|---|---|
| Comp. Ex. I | 10% FOSEEAA | Clear, hard | 3 | 3 |
| Comp. Ex. J | 12.5% FOSEEAA | Clear, hard | 2 | No data |
| Comp. Ex. K | 25% FOSEEAA | Clear, hard | 3 | 3 |

TABLE 8-continued

| Example | Fluorinated Acrylate | Appearance | Initial "Pen Test" | "Pen Test" After Dry and IPA Rubs |
|---|---|---|---|---|
| Comp. Ex. L | 10% EtFOSEA | Clear, tacky acetone soluble | 1 | 0 |
| Comp. Ex. M | 11% FOEA | Hazy, acetone soluble | 1 | 0 |
| Comp. Ex. N | 10% MeFOSEA | Hazy, soft | 2 | 0 |

The results shown in Table 8 demostrate that the absence of ceramer can produce hazy coatings lacking durability. monoacrylates do not produce the disired level of hardness and solvent resistance when compared to diacrylates.

EXAMPLE 16 AND COMPARATIVE EXAMPLE O

The admixture diluted to 50% solids in Comparative Example B was prepared, and then 0.86 parts of FOSEEAA was mixed therein. The resulting mixture was diluted to 25% solids with isopropanol. About 2.9 parts of IRGACURE™ 184 was also added and dissolved into the mixture. The resulting composition was flow coated onto PMMA to a nominal dry thickness of 4 to 5 micrometers when dried. The coated substrate was held in a vertical position at room temperature for 3 minutes and then dried at about 72° C. for 5 minutes in an air-circulating oven. The coating was cured as in Example 1. After standing for 1–2 hours the coating was subjected to Test Procedure IV "Pen Test" using a blue marker.

The above was repeated, substituting EtFOSEA for the FOSEEAA. The results are shown in Table 9.

TABLE 9

| Example | Fluorinated Acrylate | Initial "pen test" Rating |
|---|---|---|
| Example 16 | 0.99% FOSEEAA | 3 |
| Comparative Example O | 0.99% BuFOSEA | 1 |

The results in Table 9 demonstrate advantageous repellency from the diacrylate, FOSEEAA, as compared with the monoacrylate, BuFOSEA.

What is claimed is:

1. A free-radically curable ceramer composition comprising:

(a) a plurality of colloidal inorganic oxide particles wherein said colloidal inorganic oxide particles are surface treated with a surface treatment agent comprising a curable fluoro/silane component of the formula:

$$(S_y)_r\text{—W—}(R_f)_s \quad (7)$$

wherein each $S_y$ independently is a hydrolyzable silane moiety, each $R_f$ is defined by the formula $C_nF_{2+1}$, where n is 3 to 20 and one or more non-adjacent —$CF_2$— groups may be replaced by oxygen, r is at least 1, s is at least 1, and W is a linking group having r+s valent sites, and (b) a free-radically curable binder precursor, wherein said free-radically curable binder precursor comprises a free-radically curable fluorochemical component comprising at least two free-radically curable moieties and at least one fluorinated moiety.

2. The composition of claim 1, wherein each $R_f$ is independently selected from the group consisting of perfluoroalkyl, perfluoroalkylene, perfluoroalkoxy, perfluoroether and perfluoropolyether.

3. The composition of claim 1 wherein said fluoro/silane component is selected from the group consisting of:

$C_5F_{11}CH_2OCH_2CH_2CH_2Si(OCH_2CH_3)_3$, $C_7F_{15}CH_2OCH_2CH_2CH_2Si(OCH_2CH_3)_3$, $C_7F_{15}CH_2OCH_2CH_2CH_2SiCl_3$, $C_8F_{17}CH_2CH_2OCH_2CH_2CH_2SiCl_3$, $C_{18}F_{37}CH_2OCH_2CH_2CH_2CH_2SiCl_3$, $CF_3CF(CF_2Cl)CF_2CF_2SO_2N(CH_3)CH_2CH_2CH_2SiCl_3$, $C_8F_{17}SO_2N(CH_2CH_3)CH_2CH_2CH_2Si(OCH_3)_3$, $C_8F_{17}SO_2N(CH_3)CH_2CH_2CH_2Si(OCH_3)_3$, $C_8F_{17}SO_2N(CH_2CH_3)CH_2CH_2CH_2Si(OCH_3)_{av1.9}$
$[(OCH_2CH_2)_{av6.1}OCH_3]_{av1.1}$, $C_7F_{15}CH_2O(CH_2)_3Si(OCH_2CH_2OCH_2CH_2OH)_3$, $C_7F_{15}CH_2CH_2Si(CH_3)Cl_2$, $C_8F_{17}CH_2CH_2SiCl_3$, $Cl_3SiCH_2CH_2CH_2OCH_2CF_2(OCF_2CF_2)_8OCF_2CH_2OCH_2CH_2CH_2SiCl_3$, $CF_3O(CF_2CF(CF_3)O)_4CF_2C(=O)NHCH_2CH_2CH_2Si(OC_2H_5)_3$, $CF_3O(C_3F_6O)_4(CF_2O)_3CF_2CH_2OC(=O)NHCH_2CH_2CH_2Si(OCH_3)_3$, $Cl_3SiCH_2CH_2OCH_2(CF_2CF_2O)_8(CF_2O)_4CF_2CH_2CH_2CH_2SiCl_3$, $C_8F_{17}CONHC_6H_4Si(OCH_3)_3$, and $C_8F_{17}SO_2N(CH_2CH_3)CH_2CH_2CH_2Si(OCH_3)_{av1}(OCH_2CH_2(OCH_2CH_2)_2OCH_3)_{av2}$.

4. The composition of claim 1, wherein said surface treatment agent further comprises a curable silane of the formula:

$$(S_y)_q\text{—W}^o\text{—}(R^c)_p$$

wherein each $S_y$ independently is a hydrolyzable silane moiety;

each $R^c$ independently is a free-radically curable moiety;

q is at least 1; p is at least 1; and $W^o$ is a linking group having a valency of q+p.

5. The free-radically curable ceramer composition of claim 4 wherein the weight ratio of the colloidal inorganic oxide particles to the free-radically curable binder precursor is from about 1:10 to about 1:1.5.

6. The surface treatment agent of claim 4 wherein the weight ratio of the curable silane component to the fluoro/silane component is from about 4:1 to 20:1.

wherein X' is a divalent linking group capable of linking the $R_A$ moieties to the nitrogen moiety.

7. The free-radically curable ceramer composition of claim 1, wherein the free-radically curable fluorochemical component is represented by the formula:

$$(R_A)_x\text{—W—}(R_f)_y$$

wherein each $R_A$ independently represents a free-radically curable moiety, each $R_f$ independently represents a fluorinated moiety, x is at least 2; y is at least 1; and W is a linking group having x+y valent sites.

8. The composition of claim 7 wherein the free-radically curable fluorochemical component is represented by the formula:

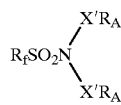

wherein X' is a divalent linking group capable of linking the $R_A$ moieties to the nitrogen moiety.

9. The composition of claim 7 wherein each $R_f$ is independently a mono- or divalent, linear or branched, cyclic or non-cylic perfluorinated moiety.

10. The composition of claim 7, wherein each $R_f$ is independently selected from the group consisting of perfluoroalkyl, perfluoroalkoxy, perfluoroether and perfluoropolyether.

11. The composition of claim 5 wherein each $R_f$ is defined by the formula $C_nF_{n2+1}$, where n is 3 to 20 and one or more non-adjacent —$CF_2$—groups may be replaced by oxygen.

12. The free-radically curable ceramer composition of claim 7, wherein the free-radically curable fluorochemical component is selected from the group consisting of $C_8F_{17}SO_2N[C_2H_4OCOCH=CH_2]_2$,
$CH_2=CH—CO—OCH_2(CF_2OCF_2)_nCH_2OCOCH=CH_2$, n=2–10
$(CF_3)_2CFCH(OCOCH=CH_2)(CF_2)_8CH(OCOCH=CH_2)CF(CF_3)_2$,
$C_4F_9CF(C_2F_5)COOCH_2C(C_2H_5)(CH_2OCOCH=CH_2)_2$,
$C_4F_9SO_2N(C_2H_4OCOCH=CH_2)_2$, and
$C_6F_{13}SO_2N(C_2H_4OCOCH=CH_2)_2$.

13. The free-radically curable ceramer composition of claim 1, wherein the free-radically curable binder precursor further comprises one or more copolymerizable free-radically curable monomers, oligomers, polymers or combination thereof.

14. The free-radically curable ceramer composition of claim 1, wherein the colloidal inorganic oxide particles comprise colloidal silica particles.

15. A free-radically cured ceramer composite, said composite being derived from
(a) a plurality of colloidal inorganic oxide particles wherein said colloidal inorganic oxide particles are surface treated with a surface treatment agent comprising a curable fluoro/silane component of the formula:

$$(S_y)_r—W—(R_f)_s \qquad (7)$$

wherein each $S_y$ independently is a hydrolyzable silane moiety,
each $R_f$ is defined by the formula $C_nF_{2n+1}$, where n is 3 to 20 and one or more non-adjacent —$CF_2$— groups may be replaced by oxygen,
r is at least 1, s is at least 1, and
W is a linking group having r+s valent sites, and
(b) a free-radically curable binder precursor, wherein said free-radically curable binder precursor comprises a free-radically curable fluorochemical component comprising at least two free-radically curable moieties and at least one fluorinated moiety.

16. The free-radically cured ceramer composite of claim 15, wherein each $R_f$ is independently selected from the group consisting of perfluoroalkyl, perfluoroalkylene, perfluoroalkoxy, perfluoroether and perfluoropolyether 17. The free-radically cured ceramer composite of claim 15, wherein said fluoro/silane component is selected from the group consisting of:

$C_5F_{11}CH_2OCH_2CH_2CH_2Si(OCH_2CH_3)_3$,
$C_7F_{15}CH_2OCH_2CH_2CH_2Si(OCH_2CH_3)_3$,
$C_7F_{15}CH_2OCH_2CH_2CH_2SiCl_3$,
$C_8F_{17}CH_2CH_2OCH_2CH_2CH_2SiCl_3$,
$Cl_8F_{37}CH_2OCH_2CH_2CH_2CH_2SiCl_3$,
$CF_3CF(CF_2Cl)CF_2CF_2SO_2N(CH_3)CH_2CH_2CH_2SiCl_3$,
$C_8F_{17}SO_2N(CH_2CH_3)CH_2CH_2CH_2Si(OCH_3)_3$,
$C_8F_{17}SO_2N(CH_3)CH_2CH_2CH_2Si(OCH_3)_3$,
$C_8F_{17}SO_2N(CH_2CH_3)CH_2CH_2CH_2Si(OCH_3)_{av1.9}[(OCH_2CH_2)_{av6.1}OCH_3]_{av1.1}$,
$C_7F_{15}CH_2O(CH_2)_3Si(OCH_2CH_2OCH_2CH_2OH)_3$,
$C_7F_{15}CH_2CH_2Si(CH_3)Cl_2$,
$C_8F_{17}CH_2CH_2SiCl_3$,
$Cl_3SiCH_2CH_2CH_2OCH_2CF_2(OCF_2CF_2)_8OCF_2CH_2OCH_2CH_2CH_2SiCl_3$,
$CF_3O(CF_2CF(CF_3)O)_4CF_2C(=O)NHCH_2CH_2CH_2Si(OC_2H_5)_3$,
$CF_3O(C_3F_6O)_4(CF_2O)_3CF_2CH_2OC(=O)NHCH_2CH_2CH_2Si(OCH_3)_3$,
$Cl_3SiCH_2CH_2OCH_2(CF_2CF_2O)_8(CF_2O)_4CF_2CH_2CH_2CH_2SiCl_3$,
$C_8F_{17}CONHC_6H_4Si(OCH_3)_3$, and
$C_8F_{17}SO_2N(CH_2CH_3)CH_2CH_2CH_2Si(OCH_3)_{av1}(OCH_2CH_2(OCH_2CH_2)_2OCH_3)_{av2}$.

18. The free-radically cured ceramer composite of claim 15, wherein the free-radically curable fluorochemical component is represented by the formula:

$$(R_A)_x—W—(R_f)_y$$

wherein each $R_A$ independently represents a free-radically curable moiety, each $R_f$ independently represents a fluorinated moiety, x is at least 2; y is at least 1; and W is a linking group having x+y valent sites.

19. The free-radically cured ceramer composite of claim 15, wherein said surface treatment agent further comprises a curable silane of the formula:

$$(S_y)_q—W^o—(R^c)_p$$

wherein each $S_y$ independently is a hydrolyzable silane moiety;
each $R^C$ independently is a free-radically curable moiety;
q is at least 1; p is at least 1; and $W^o$ is a linking group having a valency of q+p.

20. A ceramer composite structure, comprising:
(a) a polymeric substrate having a coatable surface;
(b) a free-radically cured ceramer composite provided on the surface of the substrate, said composite being derived from:
(i) a plurality of colloidal inorganic oxide particles wherein said colloidal inorganic oxide particles are surface treated with a surface treatment agent comprising a curable fluoro/silane component of the formula:

$$(S_y)_r—W—(R_f)_s \qquad (7)$$

wherein each $S_y$ independently is a hydrolyzable silane moiety,
each $R_f$ is defined by the formula $C_nF_{2n+1}$, where n is 3 to 20 and one or more non-adjacent —$CF_2$— groups may be replaced by oxygen,
r is at least 1, s is at least 1, and
W is a linking group having r+s valent sites, and (ii) a free-radically curable binder precursor, wherein said free-radically curable binder precursor comprises a free-radically curable fluorochemical component comprising at least two free-radically curable moieties and at least one fluorinated moiety.

21. The ceramer composite structure of 20, wherein the free-radically curable fluorochemical component is represented by the formula:

$$(R_A)_x-W-(R_f)_y$$

wherein each $R_A$ independently represents a free-radically curable moiety, each $R_f$ independently represents a fluorinated moiety, x is at least 2; y is at least 1; and W is a linking group having x+y valent sites.

22. The ceramer composite structure of claim 21, wherein each $R_f$ of said free-rebucally curable fluoro-chemical component is independently selected from the group consisting of perfluoroalkyl, perfluoroalkylene, perfluoroalkoxy, perfluoroether and perfluoropolyether.

23. The ceramer composite structure of claim 20, wherein the free-radically curable fluorochemical component is selected from the group consisting of $C_8F_{17}SO_2N[C_2H_4OCOCH=CH_2]_2$, $CH_2=CH-CO-OCH_2(CF_2OCF_2)_nCH_2OCOCH=CH_2$, n=2–10

$(CF_3)_2CFCH(OCOCH=CH_2)(CF_2)_8CH(OCOCH=CH_2)CF(CF_3)_2$, $C_4F_9CF(C_2F_5)COOCH_2C(C_2H_5)(CH_2OCOCH=CH_2)_2$, $C_4F_9SO_2N(C_2H_4OCOCH=CH_2)_2$, and $C_6F_{13}SO_2N(C_2H_4OCOCH=CH_2)_2$.

24. The ceramer composite structure of claim 20, wherein the free-radically curable binder precursor further comprises one or more copolymerizable free-radically curable monomer, oligomers, polymers or combination thereof.

25. The ceramer composite structure of claim 20, wherein each $R_f$ of said curable fluoro/silane component is independently selected from the group consisting of perfluoroalkyl, perfluoroalkylene, perfluoroalkoxy, perfluoroether and perfluoropolyether.

26. A method of making a ceramer composite structure, comprising the steps of:

(a) coating at least a portion of a substrate surface with a free-radically curable ceramer composition, wherein the free-radically curable ceramer composition comprises:

(i) a plurality of colloidal inorganic oxide particles wherein said colloidal inorganic oxide particles are surface treated with a surface treatment agent comprising a curable fluoro/silane component of the formula:

$$(S_v)_r-W-(R_f)_s \quad (7)$$

wherein each $S_v$ independently is a hydrolyzable silane moiety, each $R_f$ is defined by the formula $C_nF_{2n+1}$, where n is 3 to 20 and one or more non-adjacent —$CF_2$— groups may be replaced by oxygen, r is at least 1, s is at least 1, and W is a linking group having r+s valent sites, and (ii) a free-radically curable binder precursor, wherein said free-radically curable binder precursor comprises a free-radically curable fluorochemical component comprising at least two free-radically curable moieties and at least one fluorinated moiety; and (b) irradiating the coated substrate with an amount of curing energy under conditions effective to at least partially cure the coated free-radically curable ceramer composition, whereby the ceramer composite is formed on the substrate.

27. The method of claim 26, wherein the at least a portion of the substrate surface is coated at a thickness of from about 1 micron to about 100 microns of the ceramer composition.

28. The method of claim 26, wherein the ceramer composition is coated onto the at least a portion of substrate surface by spin coating, gravure coating, flow coating, spray coating, coating with a brush or roller, screen printing, knife coating, curtain coating, slide curtain coating, extrusion, squeegee coating, or a combination thereof.

* * * * *

UNITED STATES PATENT AND TRADEMARK OFFICE
CERTIFICATE OF CORRECTION

PATENT NO. : 6,497,961 B2
DATED : December 24, 2002
INVENTOR(S) : Kang, Soonkun

It is certified that error appears in the above-identified patent and that said Letters Patent is hereby corrected as shown below:

Title page,
Item [56], References Cited, U.S. PATENT DOCUMENTS, delete "3,291,846" and insert in place thereof -- 3,291,843 --

Column 6,
Line 65, delete "$C_2F_{25}SO_2NH(CH_2)_{11}O_2CC(CH_3)=CH_2$" and insert in place thereof -- $C_{12}F_{25}SO_2NH(CH_2)_{11}O_2CC(CH_3)=CH_2$ --

Column 7,
Line 7, delete "perfluorooctanesulphonarnido" and insert in place thereof
-- perfluorooctanesulphonamido --
Line 64, delete "5-vinyl-2-norbomene" and insert in place thereof
-- 5-vinyl-2-norbornene --

Column 9,
Line 13, delete "arnido" and insert in place thereof -- amido --
Line 60, delete "$R^4$" and insert in place thereof -- $R^5$ --

Column 16,
Line 37, delete "$C_7F_{15}CH_2CH_2CH_2CH_2Si(OCH_2CH_3)_3$" and insert in place thereof
-- $C_7F_{15}CH_2OCH_2CH_2CH_2Si(OCH_2CH_3)_3$ --
Lines 46-47, delete "$Si(OCH_3)_{av1,9}$" and insert in place thereof -- $Si(OCH_3)_{av1.9}$ --
Line 52, delete "$C_3SiCH_2$" and insert in place thereof -- $Cl_3SiCH_2$ --

Column 17,
Lines 9-10, delete "fluoro1silane" and insert in place thereof -- fluoro/silane --
Line 41, delete both instances of "Coming" and insert in place thereof -- Corning --

Column 20,
Line 64, delete "any" and insert in place thereof -- may --

Column 22,
Line 48, delete "SHARPE™" and insert in place thereof -- SHARPIE™ --

Column 23,
Line 24, delete "$(CF_{32}CFCH(OCOCH-CH_2)$" and insert in place thereof
-- $(CF_3)_2CFCH(OCOCH=CH_2)$ --

UNITED STATES PATENT AND TRADEMARK OFFICE
CERTIFICATE OF CORRECTION

PATENT NO.    : 6,497,961 B2
DATED         : December 24, 2002
INVENTOR(S)   : Kang, Soonkun It is certified that error appears in the above-identified patent and that said Letters Patent is hereby corrected as shown below:

Column 24,
Line 57, delete "$C_8F_{17}SO_2N(C_2H_5)(C_2H_4OCOCH=CH_2)$" and insert in place thereof
-- $C_8F_{17}SO_2N(CH_3)(C_2H_4OCOCH=CH_2)$ --
Line 60, delete "Mefosea" and insert in place thereof -- MeFOSEA --

Column 26,
Line 45, delete "TINUVN ™" and insert in place thereof -- TINUVIN™ --

Column 28,
Line 17, delete "W" and insert in place thereof -- IV --
Line 43, after "shown" insert -- in --

Column 31,
Line 14, delete "demostrate" and insert in place thereof -- demonstrate --
Line 15, delete "monoacrylates" and insert in place thereof -- Monoacrylates --
Line 16, delete "disired" and insert in place thereof -- desired --
Line 58, "$C_nF_{2+1}$" and insert in place thereof -- $C_nF_{2n+1}$ --

Column 32,
Lines 53-54, after "20:1." delete "wherein X' is a divalent linking group capable of linking the $R_A$ moieties to the nitrogen moiety. --

Column 33,
Line 14, after "perfluoroalkyl," and insert in place thereof -- perfluoroalkylene, --
Line 16, delete "claim 5" and insert in place thereof -- claim 7 --
Line 17, delete "$C_nF_{2+1}$" and insert in place thereof -- $C_nF_{2n+1}$ --

Column 34,
Line 5, delete "$Cl_8F_{37}CH_2OCH_2CH_2CH_2CH_2SiCl_3$" and insert in place thereof
-- $C_{18}F_{37}CH_2OCH_2CH_2CH_2CH_2SiCl_3$ --

Column 35,
Line 17, delete "free-rebucally curable fluoro-chemical" and insert in place thereof
-- free-redically curable fluorochemical --
Line 27, delete "$(CF_3)_2CFCH(OCOCH_2)(CF_2)8$" and insert in place thereof
-- $(CF_3)_2CFCH(OCOCH=CH_2)(CF_2)_8$ --

UNITED STATES PATENT AND TRADEMARK OFFICE
CERTIFICATE OF CORRECTION

PATENT NO.   : 6,497,961 B2
DATED        : December 24, 2002
INVENTOR(S)  : Kang, Soonkun It is certified that error appears in the above-identified patent and that said Letters Patent is hereby corrected as shown below:

Column 35 (cont'd),
Line 37, delete "monomer" and insert in place thereof -- monomers --
Line 37, delete "combination" and insert in place thereof -- combinations --

Column 36,
Line 14, delete "$(S_v)_r - W - (R_f)_s$" and insert in place thereof -- $(S_y)_r - W - (R_f)_s$ --
Line 17, delete "$C_nF_{2+1}$" and insert in place thereof -- $C_nF_{2n+1}$ --

Signed and Sealed this

Second Day of November, 2004

JON W. DUDAS
*Director of the United States Patent and Trademark Office*